US011885552B2

(12) United States Patent
Youngstrom et al.

(10) Patent No.: US 11,885,552 B2
(45) Date of Patent: Jan. 30, 2024

(54) METHOD FOR CREATING ICE STRUCTURES

(71) Applicants: James Youngstrom, Rigby, ID (US); Randall B. Bateman, Sandy, UT (US)

(72) Inventors: James Youngstrom, Rigby, ID (US); Randall B. Bateman, Sandy, UT (US)

(*) Notice: Subject to any disclaimer, the term of this patent is extended or adjusted under 35 U.S.C. 154(b) by 269 days.

(21) Appl. No.: 17/214,796

(22) Filed: Mar. 26, 2021

(65) Prior Publication Data

US 2021/0285709 A1 Sep. 16, 2021

Related U.S. Application Data

(63) Continuation-in-part of application No. 16/877,356, filed on May 18, 2020, now Pat. No. 11,243,018, which is a continuation of application No. 16/667,482, filed on Oct. 29, 2019, now Pat. No. 10,663,204.

(60) Provisional application No. 63/127,825, filed on Dec. 18, 2020, provisional application No. 63/086,594, filed on Oct. 1, 2020, provisional application No. 62/753,813, filed on Oct. 31, 2018.

(51) Int. Cl.

| | |
|---|---|
| ***F25C 1/04*** | (2018.01) |
| ***F25C 1/22*** | (2018.01) |
| ***F25C 5/14*** | (2006.01) |
| ***B28B 1/00*** | (2006.01) |
| ***E04B 1/12*** | (2006.01) |
| ***E04B 1/16*** | (2006.01) |

(52) U.S. Cl.

CPC ................ *F25C 5/14* (2013.01); *B28B 1/007* (2013.01); *F25C 1/04* (2013.01); *F25C 1/22* (2013.01); *F25C 2300/00* (2013.01); *F25C 2303/00* (2013.01)

(58) Field of Classification Search

CPC .......... F25C 5/14; F25C 1/22; F25C 2300/00; F25C 2303/00; F25C 3/00; F25C 1/04; B28B 1/007

USPC ............................................................ 52/233

See application file for complete search history.

(56) References Cited

U.S. PATENT DOCUMENTS

| | | | |
|---|---|---|---|
| 932,329 | A | 8/1909 | Rogers |
| 1,505,218 | A | 8/1924 | Sartore |
| 1,742,122 | A | 12/1929 | Bentley |
| 1,873,286 | A | 8/1932 | Chase |
| 1,907,502 | A | 5/1933 | Chilton |
| 1,952,729 | A | 3/1935 | Rawlings |
| 2,023,923 | A | 12/1935 | Harbordt |

(Continued)

FOREIGN PATENT DOCUMENTS

| | | |
|---|---|---|
| GB | 2386844 | 10/2003 |
| WO | WO202081037 | 2/2003 |

OTHER PUBLICATIONS

Jeremy Hall, Photographs, Flikr, Jan. 12, 2009 (Labeled LABE00441-00444).

(Continued)

*Primary Examiner* — Robert Canfield

(74) *Attorney, Agent, or Firm* — BATEMAN IP; Randall B. Bateman

(57) ABSTRACT

A method for building an ice structure includes making a plurality of ice logs or ice beams and attaching the ice logs together to form a support structure. The support structure may be two or more stories high and may be constructed by freezing the ice logs or ice beams together.

21 Claims, 28 Drawing Sheets

(56) References Cited

U.S. PATENT DOCUMENTS

| | | | | |
|---|---|---|---|---|
| 2,113,359 | A | 4/1938 | Stebbins | |
| 2,129,832 | A | 9/1938 | Eckrich et al. | |
| 2,133,521 | A | 10/1938 | Wussow | |
| 2,166,560 | A | 7/1939 | Schmelzer | |
| RE21,249 | E | 10/1939 | Uline | |
| 2,220,018 | A | 10/1940 | McKenna | |
| 2,225,694 | A | 12/1940 | Freeman | |
| 2,243,363 | A | 5/1941 | Thomas | |
| 2,536,217 | A | 1/1951 | Pownall | |
| 2,704,928 | A | 3/1955 | Curry | |
| 2,741,103 | A | 4/1956 | Cummins | |
| 2,768,507 | A | 10/1956 | Hoen | |
| 3,095,308 | A | 6/1963 | Rumsey, Jr. | |
| 3,274,794 | A | 9/1966 | Wilbushewich | |
| 3,396,545 | A | 8/1968 | Lamberton | |
| 3,565,389 | A | 2/1971 | Price | |
| 3,595,086 | A | 7/1971 | Bonnet | |
| 3,643,440 | A | 2/1972 | Knisse | |
| 3,750,412 | A | 8/1973 | Fitch et al. | |
| 3,831,769 | A | 8/1974 | Fank | |
| 3,957,098 | A | 5/1976 | Hepworth | |
| 4,099,946 | A | 7/1978 | Alexander | |
| 4,206,899 | A | 6/1980 | Whitehead | |
| 4,217,762 | A | 8/1980 | Sakamoto | |
| 4,223,043 | A | 9/1980 | Johnson | |
| 4,247,005 | A | 1/1981 | Buxton | |
| 4,326,822 | A | 4/1982 | Oshima | |
| 4,449,847 | A | 5/1984 | Scales | |
| 4,602,489 | A | 7/1986 | Hara | |
| 4,813,646 | A | 3/1989 | Fujio | |
| 4,910,976 | A | 3/1990 | Drummond, III | |
| 4,947,615 | A * | 8/1990 | Peacock | E04B 1/10 52/745.05 |
| 5,158,395 | A | 10/1992 | Holmberg | |
| 5,324,483 | A | 6/1994 | Cody | |
| 5,476,673 | A | 12/1995 | Sombrio | |
| 5,520,010 | A | 5/1996 | Altman | |
| 5,714,127 | A | 2/1998 | DeWitt | |
| 5,971,352 | A | 10/1999 | Kirks | |
| 6,083,072 | A * | 7/2000 | Brooks | A63H 33/32 446/236 |
| 6,209,849 | B1 | 4/2001 | Dickmeyer | |
| 6,212,844 | B1 * | 4/2001 | Lange | E04B 2/702 52/586.1 |
| 6,345,802 | B2 | 2/2002 | Moore | |
| 6,352,392 | B1 * | 3/2002 | McCartney | E21D 15/48 299/11 |
| 6,363,672 | B1 * | 4/2002 | Baker | E04B 2/705 52/586.1 |
| 6,460,302 | B1 * | 10/2002 | Neuhaus, III | E04B 1/161 52/261 |
| 6,508,075 | B1 | 1/2003 | Shipley | |
| D492,600 | S | 7/2004 | Moore | |
| 7,000,887 | B1 * | 2/2006 | Mulhern | F25C 3/00 249/157 |
| 8,511,042 | B2 | 8/2013 | Christensen | |
| 9,776,188 | B1 | 10/2017 | Kamees | |
| 10,422,546 | B2 | 9/2019 | Christensen | |
| 10,422,564 | B2 | 9/2019 | Christensen | |
| 10,663,204 | B2 | 5/2020 | Youngstrom | |
| 11,009,276 | B1 * | 5/2021 | Clark | B30B 11/02 |
| 2001/0007345 | A1 | 7/2001 | Moore | |
| 2001/0025495 | A1 | 10/2001 | Newman | |
| 2003/0034317 | A1 | 2/2003 | Lafond | |
| 2004/0075038 | A1 | 4/2004 | Hang | |
| 2005/0161414 | A1 | 7/2005 | Wescott, III | |
| 2006/0054720 | A1 | 3/2006 | Valiton | |
| 2006/0175527 | A1 | 8/2006 | Morgan | |
| 2007/0003369 | A1 | 1/2007 | Hanson | |
| 2007/0014693 | A1 | 1/2007 | Kantrowitz | |
| 2009/0205274 | A1 * | 8/2009 | Loeks | E04B 2/705 52/404.1 |
| 2010/0251733 | A1 | 10/2010 | Kim | |
| 2011/0198345 | A1 | 8/2011 | Feilders | |
| 2012/0177446 | A1 | 7/2012 | Christensen | |
| 2012/0198781 | A1 * | 8/2012 | Wrightman | E04B 2/705 52/745.09 |
| 2012/0277906 | A1 | 11/2012 | Fassberg | |
| 2013/0116597 | A1 | 5/2013 | Rudge | |
| 2014/0008249 | A1 | 1/2014 | Muller | |
| 2017/0043346 | A1 | 2/2017 | Welch | |
| 2017/0144080 | A1 * | 5/2017 | McMahon | B28B 7/0014 |
| 2017/0198957 | A1 | 7/2017 | Barrett | |
| 2017/0282185 | A1 | 10/2017 | Kamees | |
| 2018/0017303 | A1 | 1/2018 | Hsu | |
| 2018/0178219 | A1 | 6/2018 | Bazin | |
| 2018/0202699 | A1 | 7/2018 | Migishima | |
| 2018/0252454 | A1 | 9/2018 | Christensen | |
| 2018/0257088 | A1 | 9/2018 | Ritter | |
| 2018/0283759 | A1 | 10/2018 | Bess | |
| 2018/0361388 | A1 | 12/2018 | Welch | |

OTHER PUBLICATIONS

Jeremy Hall, Photographs, Flikr, Feb. 5, 2009 (Labeled LABE00404).
Zermatt Resort, Dec. 18, 2009 (Labeled LABE00460-468).
Alaskanalpineclub.org website showing ice towers constructed from 2003-2008, publicly available prior to Jan. 10, 2010. (Labeled LABE 00150-00165).
Adirondack Daily Enterprise—The Origins of Saranac Lake's Winter Carnival—Village's Premiere Event Had Modest Beginnings. Publicly available Feb. 1997. (Labeled LABE 00166-00196).
History of the Adirondacks—Castles of Ice—published at least as early as Apr. 4, 2001. (Labeled LABE 00197-00202).
Ice Castle at Lake Louise, Banff, Albert Canada, made available to the public by Cosmic_kidd99—Flickr—Feb. 22, 2009. (Labeled LABE 00354).
The castles at Silverthorne—www.icecastles.com—Dec. 9, 2009. (Labeled LABE 00279-00284).
Midway Ice Castles: Day One! First Week and Fun Facts—Brent Christensen's publicly available blog www.brentsicecastle.blogspot.com/2009/12/first-day-of-brents-ice-castle-at.html.—Dec. 8, 2009. (Labeled ABE00289-298).
Jeanae Jeffries, Daily Herald, Resident Creates Own Ice Castle, Jan. 28, 2009 ( Labeled LABE00203).
Alex Cabrero, KSL.com, Ice Castles Turns Heads at Midway Resort—Dec. 25, 2009. (Labeled ABE00469-487).
https://web.archive.org/web/2012011317 5220/http://www.icecastles.corn/.
https://www.diynetwork.com/how-to/outdoors/patios-and-decks/howto-build-custom-deck-railings (Exact Date unknown—believed to be 2015).
https://www.creativemechanisms.com/blog/all-about-polypropylenepp-plastic—May 4, 2016.
https :/ /www.creativemechanisms.com/blog/polyethylene-pe-forprototypes-3d-printing-and-cnc—Sep. 14, 2015.
www.instructables.com/id/Easy-ice-sculpture-for-kids-of-all-ages/, Mar. 5, 2012.
Request for Inter Partes Review, U.S. Pat. No. 10,663,204.
Easy Ice Sculpture—for Kids of All Ages—Mar. 5, 2012.
Everything You Need to Know About Polypropylene—May 4, 2016.
8 page PDF title "Constructing Ice Structures" From Finding Lab. (Year: 2017).

* cited by examiner

Select a sleeve fill sleeve at least partially with water subject water-filled sleeve to a temperature below 32℉ until water turns to ice (optional) cut into desired lengths (optional) remove sleeve from ice

FIG. 11 select a plurality of ice logs

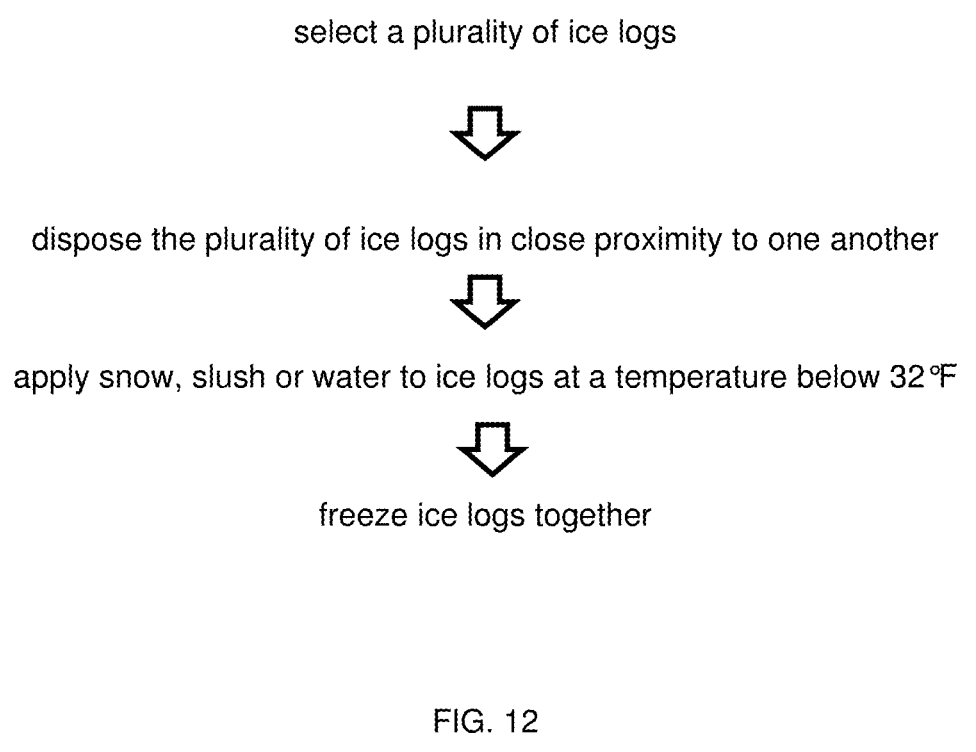

⇩ dispose the plurality of ice logs in close proximity to one another

⇩ apply snow, slush or water to ice logs at a temperature below 32°F

⇩ freeze ice logs together

FIG. 12

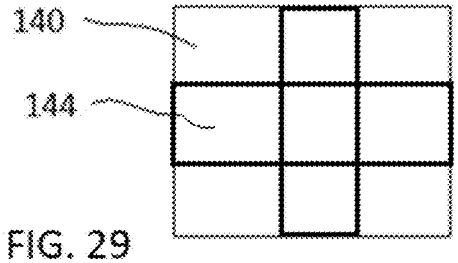
FIG. 29
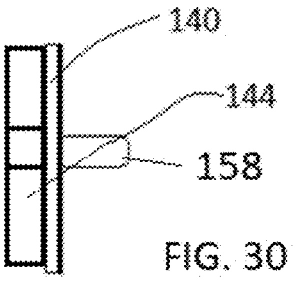
FIG. 30
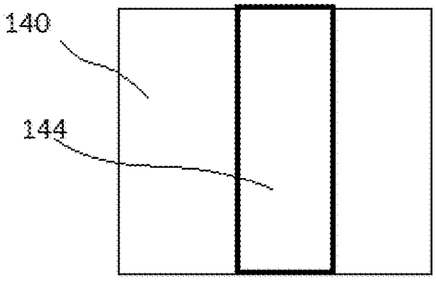
FIG. 31
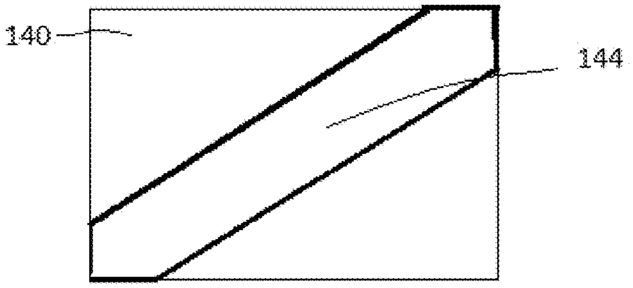
FIG. 32
FIG. 33
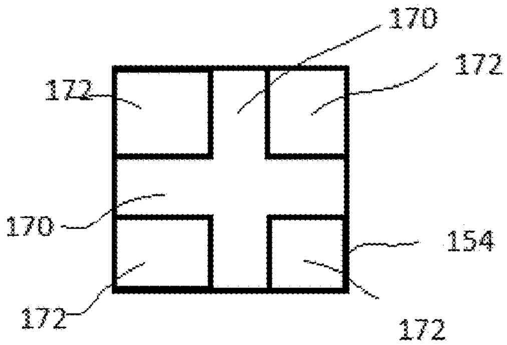

FIG. 34
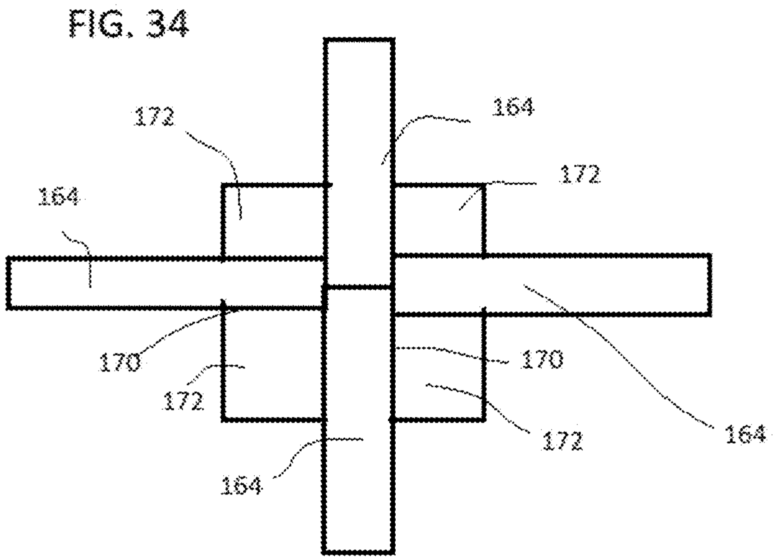
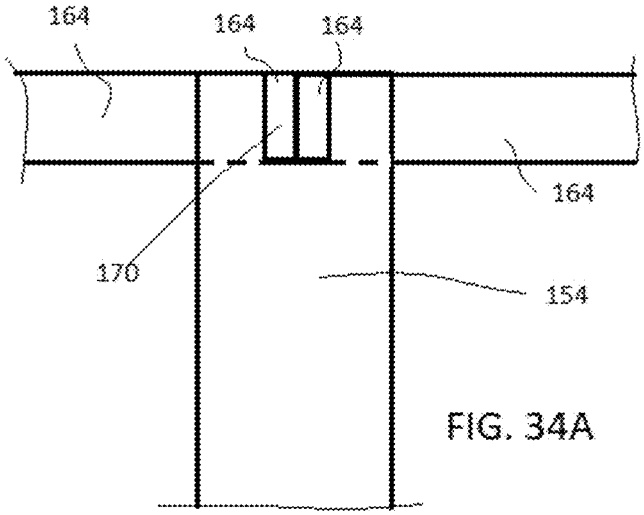
FIG. 34A

FIG. 40
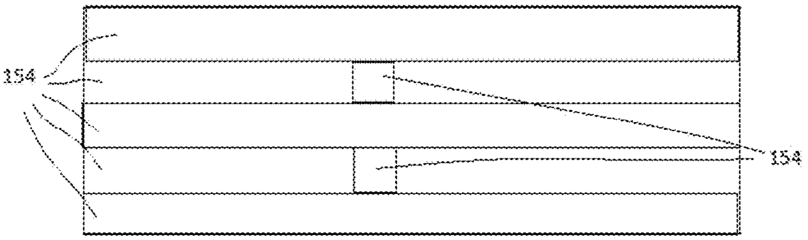
FIG. 41
FIG. 42
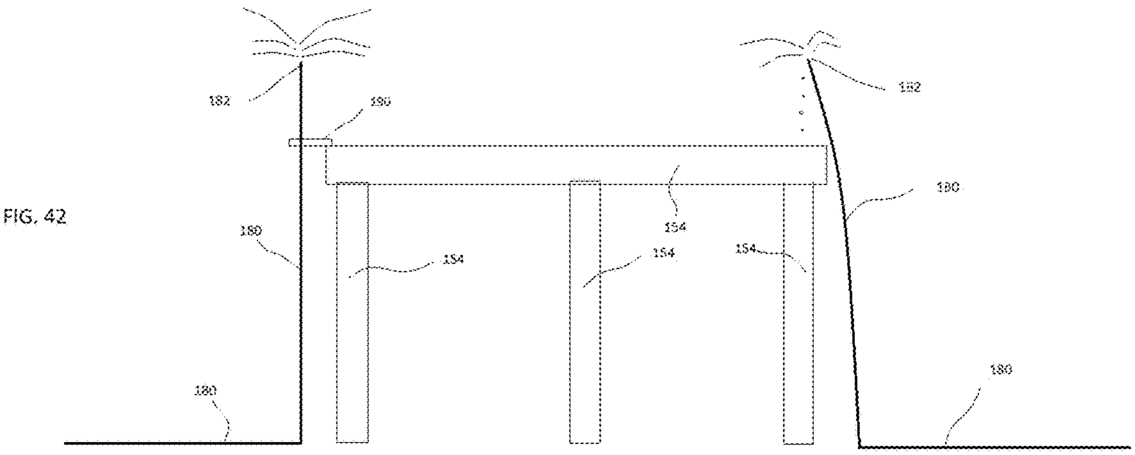

METHOD FOR CREATING ICE STRUCTURES

BACKGROUND

State of the Art

The present disclosure relates to ice structures, and in particular to methods of forming ice structures to be covered in ice to make temporary structures, art or public attractions.

Field of Art

There are a variety of situations in which structures are made of snow or ice. For example, many cities have winter festivals which include contests for displays made from ice. In some locations, buildings are made of ice during the wintertime. Some northern countries even have hotels which are formed by ice or snow which has been carved or otherwise shaped to provide sleeping rooms, restaurants, etc.

One popular use for ice structures is as an entertainment destination. In many locations a structure is built and then sprayed with water so that the underlying structure is encased in ice. Usually, the sprayed water is allowed to drip so as to form icicles hanging from the underlying structure. The structures, commonly referred to as ice castles or ice palaces, can be provided with colored backlighting so as to form pieces of art for viewing by the public. In some cases, the ice sculptures are so large that they can include tunnels and walkways where visitors can actually walk on/through the ice castle. As water continues to be sprayed, the structure grows, often to the height of 2 or more stories.

While some have used wood or steel structures as the initial starting points for applying the water, when lights are used the generally opaque wood or steel is visible through the ice and makes the ice castle appear less natural. One solution to this problem is disclosed in U.S. Pat. No. 8,511,042 ("the '042 patent"). The '042 patent shows a method of constructing structures in which a table or other raised structure is used with running water or sprinklers to create a number of icicles extending downwardly from the table. Once the icicles have reached a desired size they are broken off and attached to one another by the use of slush or an ice/water mixture. These icicles are used as a framework which is over sprayed with water to form the ice structure.

One concern with the methodology used in the '042 patent is that icicles are somewhat unpredictable in their formation and may be substantially broader on one end than the other. Icicles also may have inconsistent thickness and density along their length. Another concern is that a substantial amount of water may be used simply forming the icicles used to form the initial structure.

Still another concern with the method taught in the '042 patent is that slush is used to hold each icicle to the other parts of the frame. This requires those building the structure to attach hundreds of icicles to using wet snow. This can soak through the worker's gloves and get on their clothing. When working outside during sub-freezing temperatures, this can get uncomfortable and, in some cases, may even risk frostbite.

Other improvements have been made in the building of ice structures. For example, in U.S. Pat. No. 10,663,204, it is taught to make ice logs out of water filed sleeving. The amount of water in the sleeving can be used to control the overall shape of the ice logs, as can the manner in which the sleeving is disposed on the ground or other support structure. Additionally, the ice logs can be cut and stacked with the sleeving, thereby helping to prevent logs from being frozen together. The ice logs allow building of structures much more like building with logs or conventional lumber.

The system disclosed in the '204 patent is advantageous in that the horizontal and vertical structures can be placed on one another without the use of slush. Because the ice logs are generally round, however, the simply laying them on top of another ice log does not provide as much potential stability while the ice logs are being covered with water and frozen together.

In addition to these challenges, the method with which water is sprayed on the underlying icicles or ice logs can create issues. The water is typically conveyed to a raised sprinkler by plastic sprinkler tubing, typically PVC. Because the water is warmer than freezing, the sprinkler tubing is warmer than freezing and can slowly cut through the ice. Additionally, any water not sprayed by the sprinkler and running down the tubing will melt ice. Thus, when looking at the sprinkler from above, it is often possible to see all the way to the ground around the sprinkler. This allows the sprinkler tubing to bend and makes control of the water pattern less predictable.

Thus, there is a need for a method for constructing ice structures which is relatively easy to use and provides improved predictability.

SUMMARY OF THE INVENTION

A method for creating ice structures may include the formation of a plurality of ice logs. The ice logs may then be joined together to build a desired ice structure.

In accordance with one aspect of the invention, the ice logs are formed by filling elongate sleeves with water and allowing the water to freeze. The elongate sleeves are then removed from the ice log formed by the frozen water and the ice logs are used to construct the desired ice structure, or a frame upon which a desired ice structure is formed.

In accordance with another aspect of the invention, the elongate sleeves may be formed from a thin, disposable plastic, polyurethane or other material. The material can then be filled with water and may be bent or otherwise disposed in a desired shape to form an ice log having the desired characteristics.

In accordance with another aspect of the invention, once water in the elongate sleeves has frozen, a saw may be used to cut ice logs of the desired size. Thus, for example, an initial ice log may be formed which is 6 inches in diameter and 60 feet long. A chainsaw can then be used to cut the ice log into five 8-foot segments and two 10-foot segments.

In accordance with another aspect of the invention, the ice logs can be connected to form a structure which has 2 or more stories and preplanned pathways, balconies, etc., along which visitors can walk.

In accordance with another aspect of the invention, the ice logs can be shaped at some position to allow the ice logs to rest on top of one another with more stability.

In accordance with another aspect of the invention, the ice logs can be inserted into a hole formed in another ice log so as to hold the first ice log in place so that the ice logs may freeze together without the need for using slush.

In accordance with another aspect of the invention, ice beams may be formed in a mold having at least one generally flat side so as to facilitate placement of the ice beam on the end of an ice log or another ice beam. In some embodiments, a mold having a generally rectangular or square internal cross-section may be used so that the ice beams have generally flat sides which facilitate stacking the ice beams on top of one another without the use of slush.

In accordance with another aspect of the present disclosure, the ice beams may be formed within a sleeve disposed within the mold so that the ice beam can be removed from the mold without sticking and so that the ice beams can be kept with less likelihood of sticking together.

In accordance with another aspect of the invention, the ice logs can have a hole formed therein so as to allow an ice spike to be inserted to attach to ice logs and/or ice beams together to help hold them in place until water can be used to freeze them into a solid mass.

In accordance with another aspect of the invention, the mold may have one or more projection which can pre-form a hole into the ice beams to facilitate joining the ice beams with an ice spike.

In accordance with another aspect of the present disclosure, the water tubes used to spray water on the ice may be thermally isolated from the ice logs to prevent movement of the tubing and damage to the ice logs.

In accordance with another aspect of the present disclosure, an inflatable or otherwise collapsible mold can be used to form ice to create rooms with domed ceilings.

BRIEF DESCRIPTION OF THE DRAWINGS

Various embodiments of the present disclosure are shown and described in reference to the numbered drawings wherein:

FIG. 11 shows a flowchart for forming ice logs in accordance with principles of the present disclosure; and FIG. 12 shows a flowchart for building an ice structure in accordance with principles of the present disclosure.

FIGS. 29, 31 and 32 show end views of caps which can be used to form and end of an ice beam to facilitate its use in construction.

FIG. 30 shows a side view of the cap shown in FIG. 29;

FIG. 33 shows the end view of beam formed using the cap shown in FIGS. 29 and 30;

FIG. 34 shows a top view and FIG. 34A show a side view of the beam of FIG. 33 with a plurality of other beams disposed in the channels in the end;

FIG. 40 shows a side view of a sleeve disposed in a mold;

FIG. 41 shows a side view of a wall formed by stacked ice beams;

FIG. 42 shows a side view of a method for thermally isolating the water supply tubes from the ice.

Figure 1:
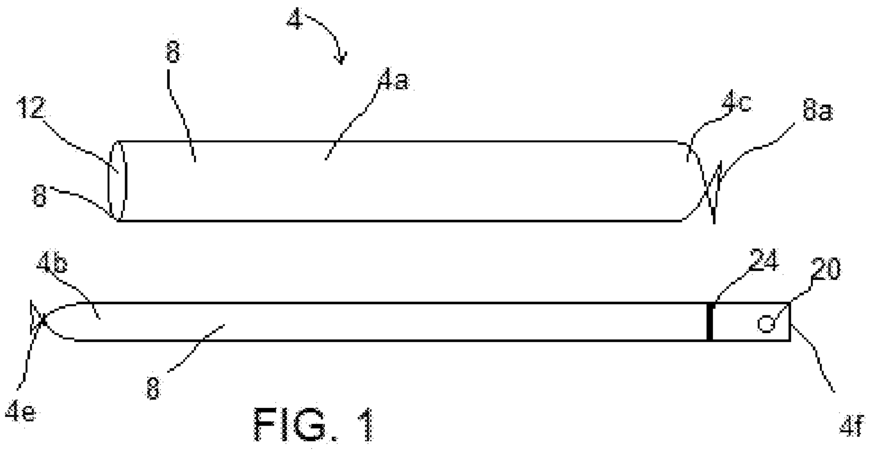
FIG. 1 illustrates a pair of sleeves having water contained therein for making ice logs.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present disclosure. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments, or only some aspects may be included in an embodiment. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present disclosure is disclosed and described in detail, it should be understood that the present disclosure is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "a bracket" may include an embodiment having one or more of such brackets, and reference to "the target plate" may include reference to one or more of such target plates.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. Thus, a room with on opening for entry could be substantially enclosed. The exact allowable degree of deviation from absolute completeness may in some cases depend on the specific context, such that enclosing nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without being exactly that quality. For example, a structure said to be generally vertical would be at least as vertical as horizontal, i.e., would extend 45 degrees or greater from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1, there is shown a side view of two ice logs 4 formed in accordance with principles of the present disclosure. The ice logs 4 may be formed by filling a sleeve 8 with water and leaving the filled sleeve at a location which is below 32° F. or 0° C. Over time, the water will turn to ice which can then be used for forming structures.

In accordance with one aspect of the present disclosure, the sleeve 8 can be formed from a thin, flexible material such as many plastics, such as polyethylene. The material can also be see-through so that the user can ensure that there are no large bubbles trapped inside the sleeve. Typically, the flexible sleeve will be tied or clamped off at one end, filled to the desired length and then the opposing end tied off or clamped.

As shown on ice log 4*a*, the end 8*a* of the sleeve may simply be tied off by knotting the end of the sleeve 8 to form end 4*c* of the ice log. In the alternative, a tie or clamp could be used to close the end as shown at end 4*e* on ice log 4*b*. The use of a thin, flexible material may allow the person making an ice structure to cut the ice log 4*a* to a desired length by the use of a saw, etc. as shown at end 4*d* on ice log 4*a* (thereby exposing the frozen water 12). The sleeve 8 can then be stripped off the ice log 4 and the ice log used as needed.

According to one configuration, the person making the ice structure may be able to plan needed lengths and to know the dimensions of the piece beforehand. Culturing icicles, even by the use of a table, can be somewhat unpredictable as temperature, wind and flow patterns result in a variety of different shapes. Water has to be added at a flow rate which is fast enough that the water does not freeze before forming the icicle, but not so fast that the water flows over and melts an existing icicle. A strong breeze can cause the icicles for form at an angle, and/or can disrupt the flow of water to the growing icicle. A warm breeze can melt back the icicles, requiring that they be given additional time to grow to a desired length. Very strong winds can cause icicles to break off the structure from which they hang.

In contrast, with the present disclosure the person making the structure may know that they will need 50 ice logs which are 10 feet long each. The person can then fill five 100-foot sleeves 8 having the desired diameter with water and leave them out to freeze overnight or for a couple of days depending on the temperature. As soon as the water is properly frozen a chainsaw can be used to quickly form 50 ice logs of the same length so that building may commence.

According to another configuration, the ice logs can also be formed in an industrial freezer or a refrigerated trailer if necessary and can be stacked on shelves to maximize the number of logs created in a small space. Because the water is contained within the sleeves 8, the floor of the freezer will not be slippery, and the structural components of the ice structure can be pre-made. As soon as the ambient temperature falls to a desired threshold, the ice logs 4 can be assembled into the ice structure and, if desired, sprayed with water to cover the ice structure in icicles. This may substantially speed up the process for forming the ice structures (such as ice castles/ice palaces), thereby allowing an attraction to be open earlier and generate larger revenues.

Another advantage of forming the ice logs in plastic sleeves is that ice has a tendency to freeze to other pieces of ice. If a number of pieces of ice are stacked on top of one another, it is not uncommon for the pieces to freeze together, thereby requiring pieces of ice to be broken off the other pieces of ice when it is needed for use. The plastic sleeves, however, tend to prevent or minimize the ice logs from freezing to each other. Thus, a large number of ice logs can be placed on top of one another (either for shipping or simply for convenience during use) with the plastic sleeves left in place so that ice logs do not freeze together. Once needed, the log can be moved into place and the plastic sleeve cut with a razor blade, etc., to remove it from the ice log immediately before use.

According to another configuration, the various load capacities of the structure can be calculated more readily. Because the ice logs will be substantially solid ice, the amount of weight which can be carried by an individual log over a given span can be more readily calculated than using a structure which forms more randomly and which is inconsistent from end to end, such as an icicle. For example, on lake ice, 3 inches of ice will support a person on foot, 4 inches will support a group in single file, while 7½ inches will support a passenger car. In the present disclosure a balcony could be formed by placing a number of 4-inch diameter ice logs adjacent one another and then running a sprinkler over the logs to create another inch or two of ice. While large diameter ice logs can be used for building structural support, smaller diameter ice logs can be used for providing a frame to grow icicles and for connecting large diameter ice logs for lateral support.

In some applications, such as where a specific three-dimensional shape is desired, the sleeve 8 could be formed from a more rigid plastic, such as polyvinyl chloride. In such configurations the sleeve 8 may include a port 20 (shown on sleeve 4*b* of FIG. 1) and retainers 24 for holding opposing sides of the sleeve together while the water freezes into an ice log. The sleeve 8 may also be squared off as shown at end 4F of ice log 4*b*.

A rigid sleeve could be made in a variety of shapes. For example, the sleeve may form a void which is generally helical in shape. The two halves of the sleeve could be held together with the retainer(s) 24 and filled with water. Once the water is frozen the two halves of the sleeve can be removed thereby leaving a helically shaped ice log which can be used as a design element.

It will be appreciated that a variety of different dimensions of ice logs may be used. For example, a large balcony may be supported by ice logs having a 6-inch or 8-inch diameter. In contrast ice logs could be made having a 2- or 3-inch diameter when being used as an initial structure for growing icicles and the like as part of design elements which have relatively minor loadbearing requirements.

The ice logs 4 may be preferred in some applications over wood or steel frames. When an “ice castle” is illuminated, a steel or wood frame may be visible, at least in shadow, and may lessen the aesthetic desirability of the ice castle. In contrast, ice logs are typically translucent and, in many cases, transparent thereby allowing light to more readily flow through the design, improving the design’s aesthetics. In fact, icicles can entrain air as they are being formed, leaving the icicle with a cloudy appearance with partially obscures light. In contrast, as the water being used to form an ice log sits air bubbles tend to pass out of the water, often leaving the ice longs more translucent than many icicles. This can be advantageous for lighted ice structures.

Figure 2:
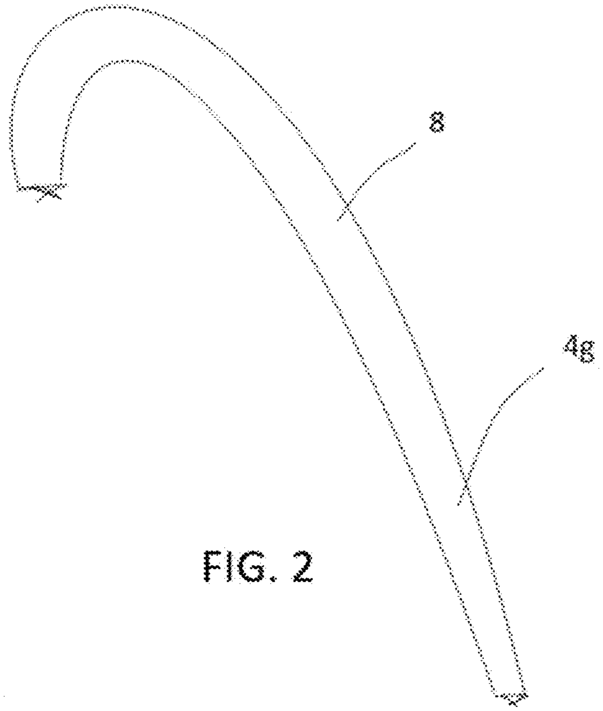
FIG. 2 illustrates a sleeve having water contained therein for making an ice log in the shape of a candy cane.

Turning now to FIG. 2, there is shown an ice log 4*g* disposed in a liner 8 in the shape of a candy cane. The sleeve or liner 8 may be rigid, such as two rigid pieces being held together to hold the water as it freezes, or the liner may be flexible and simply moved into the desired shape once it has been filled with water and the ends tied off. Unlike the use of icicles, etc., the use of the liner or sleeve 8 allows for a wide variety of shapes to be formed which may be used in the aesthetics of the ice structure being made. For example, if the ice structure is meant to replicate Santa's workshop, two candy cane-shaped ice logs could be disposed on either side of the door into the ice structure. While the candy cane-shaped ice log 4*g* could be subjected to sprinklers spraying water so as to generate icicles, the ice log itself may be used as an aesthetic feature of the overall design of the ice structure. A similar shape could also be used as the runner for a sleigh.

The use of a flexible sleeve 8 is highly advantageous because the shapes into which the ice logs are formed are up to the creativity of the creator. Additionally, a thin flexible sleeve which can be cut away is advantageous because it is easy to remove the ice log from the sleeve regardless of its shape. All the creator needs to do is run a razor blade down the sleeve and pull the sleeve off the ice log.

Figure 3:
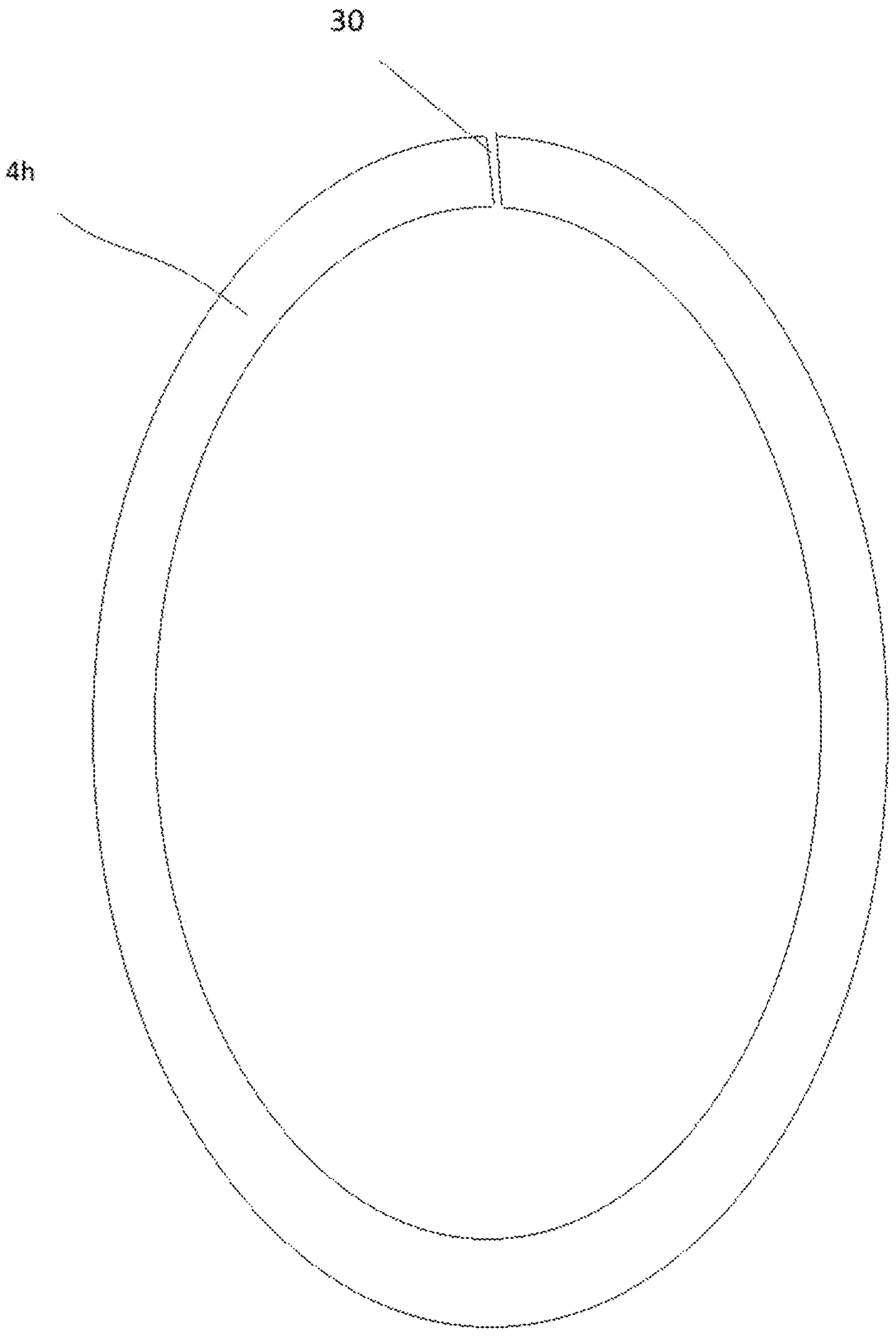
FIG. 3 illustrates an ice log formed in an oval shape as could be used to form an oval-shaped room.

FIG. 3 shows an ice log 4*h* formed in an oval shape. The oval-shaped ice log 4*h* could be used to form an oval-shaped room, either by being placed adjacent the bottom of a number of ice logs extending vertically so as to anchor the ice logs in a desired pattern, or by resting on top of the vertical ice logs so as to create a continuous header around the room. Once the oval-shaped ice log 4*h* is in place, the small opening 30 could be closed by filling the same with snow or slush and applying water. Of course, a number of ice logs 4*h* could be placed front-to-front so as to form a tunnel by simply applying a small amount of water to freeze the ice logs together. One advantage of this method of building an ice structure is that the person making the ice structure can form a footer and header for a wall in any desired shape. Instead of having to individually connect dozens of small icicles to form a wall, a single footer can be placed on the ground, vertically extending ice logs anchored thereto, and then a header placed along the tops of the vertically extending logs. Thus, for example, a wall 20 feet long and 10 feet high could be built with as few as 6-8 pieces of ice. The wall could provide a smooth curvature or other shape. In contrast, building such a wall from icicles may require dozens of icicles and multiple layers.

Figure 4:
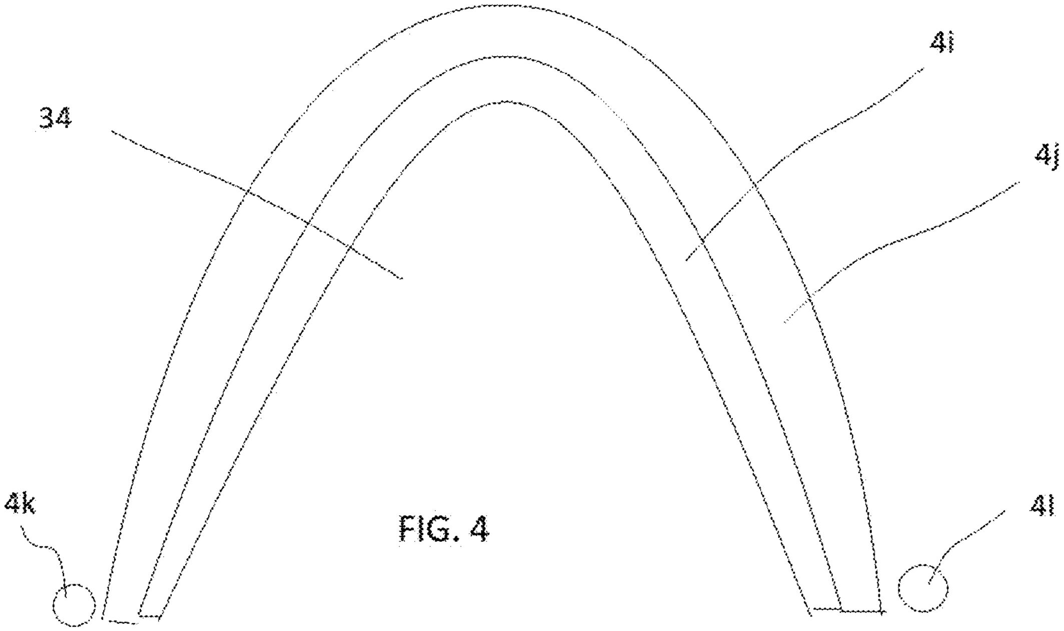
FIG. 4 illustrates an end view of a pair of arcuate ice logs forming a tunnel and a pair of ice logs being used to anchor the arcuate ice logs.

FIG. 4 illustrates an end view of a pair of arcuate ice logs 4*i* and 4*j* forming a tunnel 34 and a pair of ice logs 4*k* and 4*l* being used to anchor the arcuate ice logs. Using the ice logs as anchors is relatively easy. The anchor ice logs 4*k* and 4*l* are simply placed adjacent to the base of the more vertically extending ice logs 4*i* and 4*j* and snow or water is applied so that the ice logs freeze together. Vertically extending ice logs can also simply be disposed in place and have snow packed around their base. Because the ice logs can be cut or formed with a flat bottom, they are much easier to dispose in a vertical orientation than is an icicle. They can also be used as a footer over a length much longer than most icicles and are substantially consistent in dimension—thereby making it easier to anchor vertical ice logs into the footer than attaching icicles together would typically allow.

Figure 5:
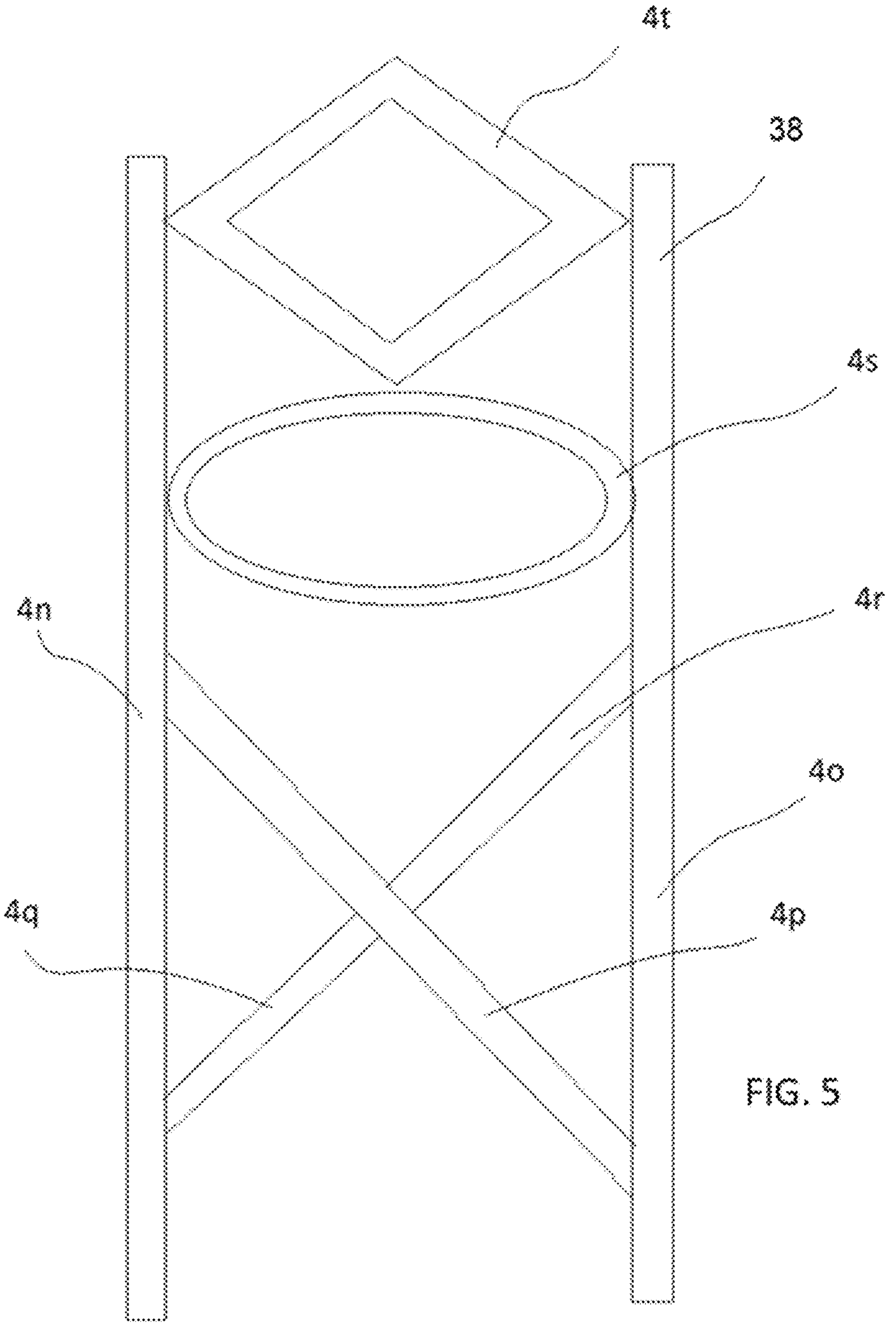
FIG. 5 shows a support structure formed out of ice logs making different shapes upon which icicles can be formed to produce a work of art or part of an ice castle.

FIG. 5 shows a support structure 38 formed out of ice logs making different shapes upon which icicles can be formed to produce a work of art or part of an ice castle. The structure 38 is formed by a first ice log 4*n* and a second ice log 4*o*. Extending between ice logs 4*n* and 4*o* is a third ice log 4*p* and two short ice logs 4*q* and 4*r* which are attached to one another so as to form an "X." The X shape can be used both aesthetically and structurally on the structure such as a design element or as a support frame for growing icicles. Disposed above the X shape is a generally oval-shaped ice log 4*s* and a diamond-shaped ice log 4*t*. The various ice logs can be attached to one another by the use of snow, slush or spraying with water until the structures freeze together. The design can be formed by bending the flexible sleeve (not shown in FIG. 5) into the desired shape. Once the water has frozen into ice and the sleeve removed, the small gap left can be filled with ice or snow.

Figure 6:
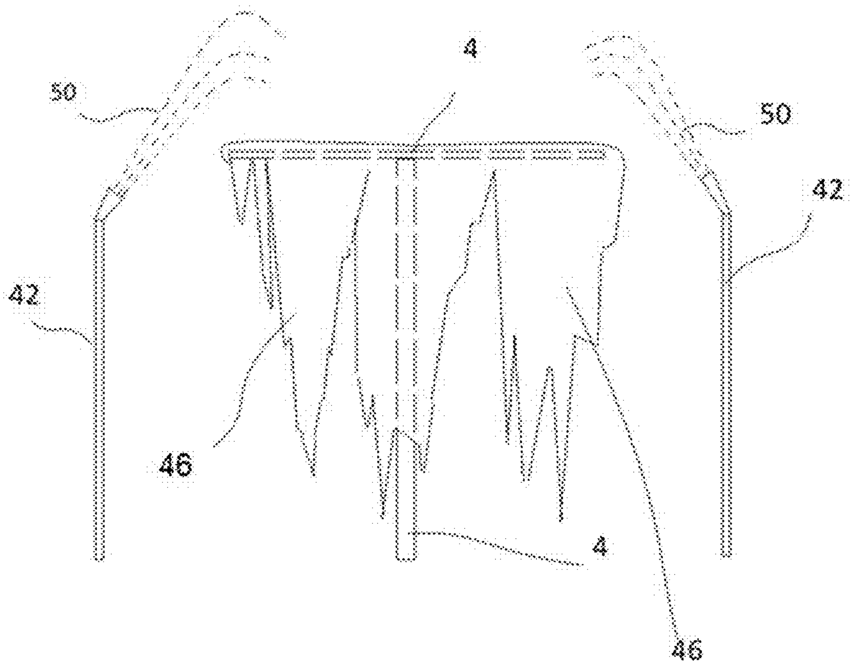
FIG. 6 shows a pair of ice logs being subjected to sprinklers or another water sprinkling device so as to form icicles on the ice logs.

FIG. 6 shows a pair of ice logs 4 being subjected to sprinklers 42 or another water spraying device so as to form icicles 46. As the water 50 contacts the ice logs 42, the water freezes and gradually builds upon itself to create random icicles. It will be appreciated in accordance with the present disclosure that the ice logs 4 could be used to form a structure in which all of the visible ice is icicles 46, or a structure which includes no icicles and is simply formed from ice logs. Most commonly, the ice logs are used to allow the builder to create walkways and other structures which enhance the user experience by allowing the user to come close to a greater part of the overall structure. Either way, the ice castle or a structure can be enhanced by lighting the structure, particularly at night, as the ice logs 4 provide minimal interference with light flow. Additional ice logs 4 can be added on top of the icicles 46 or other ice logs to further increase the size of the ice castle on display.

Figure 7:
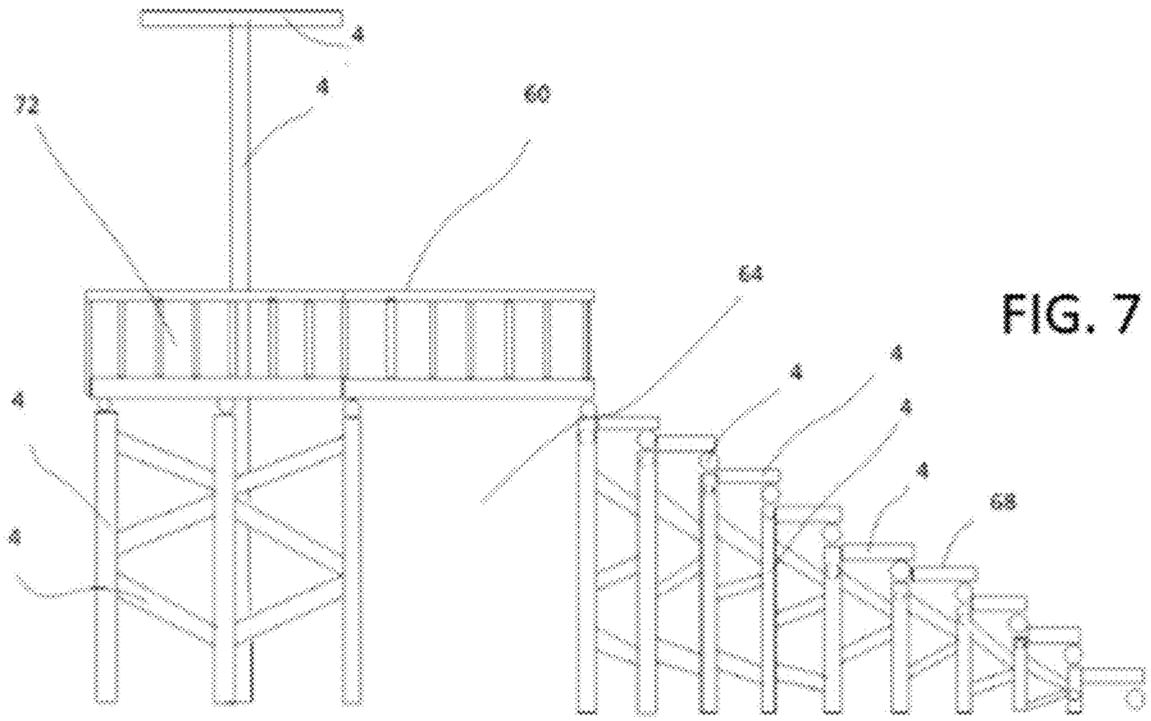
FIG. 7 illustrates an ice structure built from ice logs having a tunnel and a set of stairs leading to a second story balcony.

Turning now to FIG. 7 there is shown an ice structure 60 built from ice logs 4 (only some of which are marked) having a tunnel 64 and a set of stairs 68 leading to a second story balcony 72. Some of the ice logs 4 are disposed generally vertically so as to form support pillars, while other support logs are disposed generally horizontally to form steps, beams connecting the support pillars and supporting the ice logs forming the balcony 72. Still other ice logs can be disposed at angles between vertical and horizontal. These intervening ice logs may be used for structural support and/or as a support frame for growing icicles if all or part of the ice structure 60 is sprayed with water.

It will be appreciated that the use of the ice logs in accordance with the principles of the present disclosure allows substantial creativity on the part of the builder of the ice structure. The sleeves 8 (FIG. 1) can be used to make a wide variety of shapes in the ice logs, thereby allowing for a wide variety of designs. For example, stairways can be curved. A number of wavy ice logs could be frozen together to form a wavy slide down from a balcony. Walls formed from nothing but ice logs could be used, or the ice logs can be covered with icicles by spraying water over the ice logs. Tunnels of various shapes and sizes can be formed. Additionally, the ice logs can be formed in such a way that electrical cables or lighting could be disposed within the ice logs thereby ensuring that they would not present a tripping hazard to patrons of an ice castle display. (An image of such ice logs in shown in FIG. 13)

Figure 8:
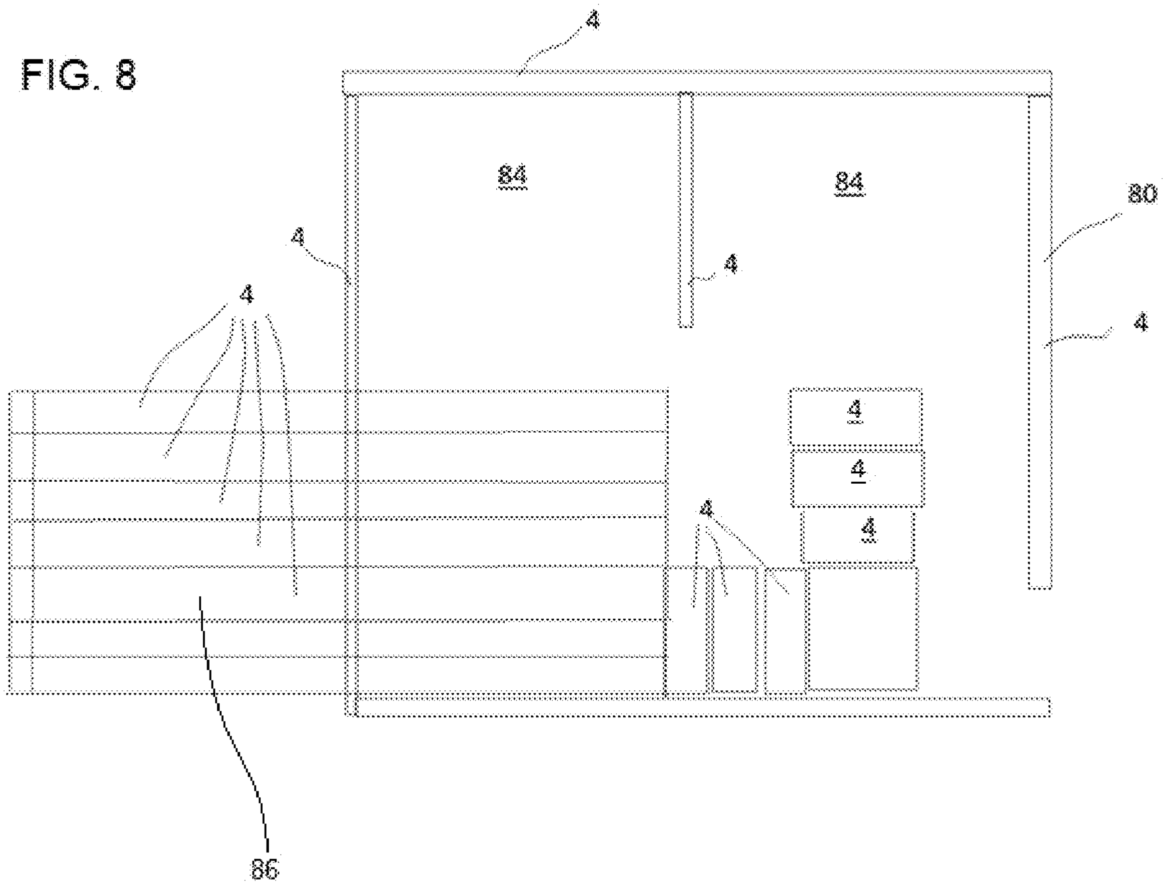
FIG. 8 shows a top view of a house having a second story with a balcony formed in accordance with principles of the present disclosure.

FIG. 8 shows a top view of a house 80 having a number of rooms 84 and a second story with a balcony 86 formed in accordance with principles of the present disclosure. It will be appreciated that the entire house could be built out of ice logs. The ice logs could be either translucent or nearly transparent to thereby conduct light through the house. If multiple different lights are used, the house could be designed to change colors as the attendees walked through the house. If desired, the house could even be structured so as to accommodate sleeping arrangements, thereby allowing the "ice house" to function as a hotel. Likewise, a restaurant could be made where the structure is nearly completely made of ice.

Figure 9:
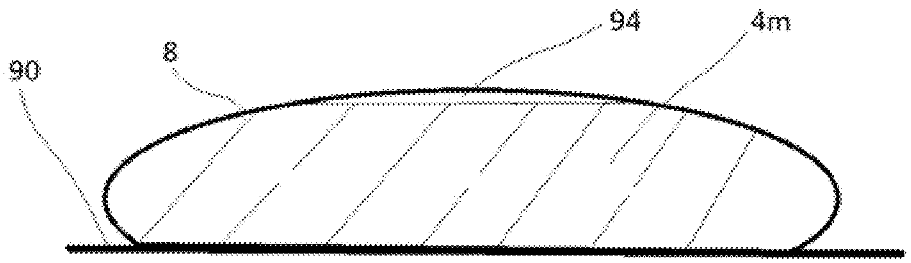
FIG. 9 shows a cross-sectional view of a sleeve partially filled with water to form a base.

FIG. 9 shows a cross-sectional view of an ice log 4*m* which is used to form a base or footing. The ice log 4*m* is formed by taking a sleeve eight and filling it partially with water so as to form a flattened ice log. The ice log 4*m* can be made at a remote location. However, there are advantages to forming the ice log 4*m* at a location in which it will serve as a base for building an ice castle/palace. The bottom of the ice log is flattened due to the partial filling of the sleeve 8. When formed in place the bottom of the ice log conforms to the ground 90 on which the ice log is formed. Thus, if the ground is uneven or sloped the ice log 4*m* will be properly positioned in place. By allowing some air into the sleeve 8 an air pocket 94 can be left. This results in a base which has a flat top surface. If desired, this flat surface can be used to build structures or otherwise receive other ice logs. It will be appreciated that ice logs can be made with flattened services facilitate building a variety of different designs.

Figure 10:
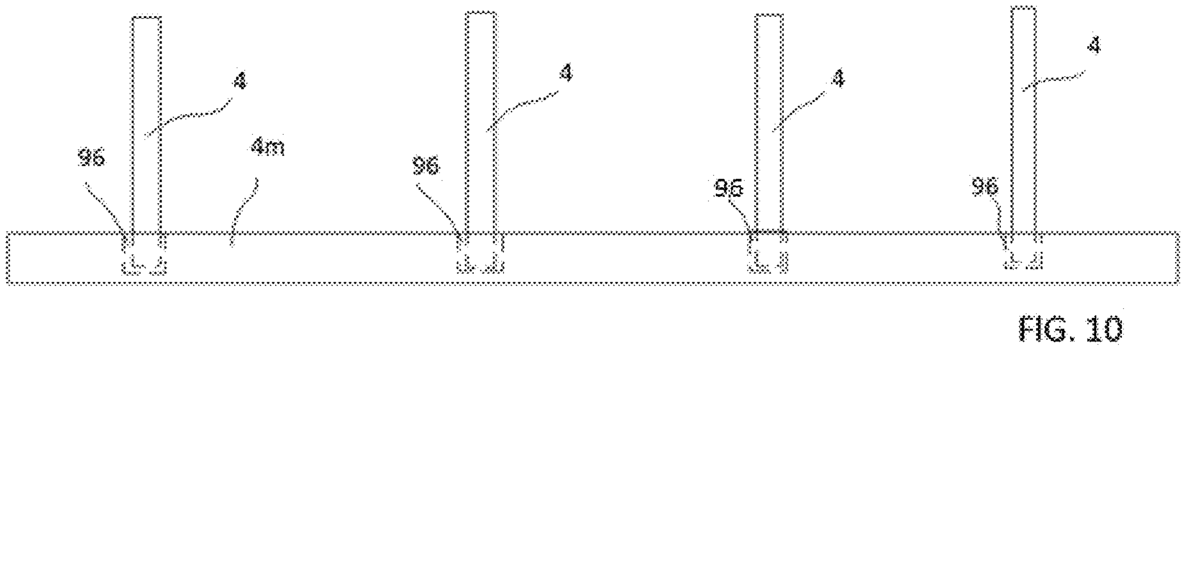
FIG. 10 shows a side view of a base having a plurality of ice logs inserted vertically to support the ice logs.

Once the ice log 4*m* has frozen, the sleeve 8 may be cut away. The portion of the sleeve between the ice log 4*m* and the ground 90 may be left in place or may be slid out as desired. The base formed by the ice log 4*m* is highly desirable as it facilitates the rapid building of ice structures. As shown in FIG. 10, the base formed by ice log 4*m* can have one or more pockets or holes 96 cut in. This can be accomplished with an auger or a chainsaw. The pockets or holes 96 may extend partially into or all the way through the ice log 4*m*. Other ice logs 4 may be inserted into the holes and slush and/or water can be poured into the holes 96 to freeze and thereby anchor the other ice logs into ice log 4*m*. If the holes are formed only slightly larger than the cross-sectional area of the other ice logs 4, the side wall defining the holes can be used to hold the other ice logs in vertical or other orientations even while the slush or water is applied and the holes freezes. This is highly advantageous as it allows an ice structure to be built in a relatively short amount of time.

While shown laying on the ground, it will be appreciated that ice log 4*m* or even a more cylindrical ice log can have holes drilled in to allow the insertion of other ice logs for the building of intricate structures. For example, an ice ladder could be formed in such a way that the rungs of the ladder formed by ice logs are securely held within larger ice logs on either side.

Figure 11:
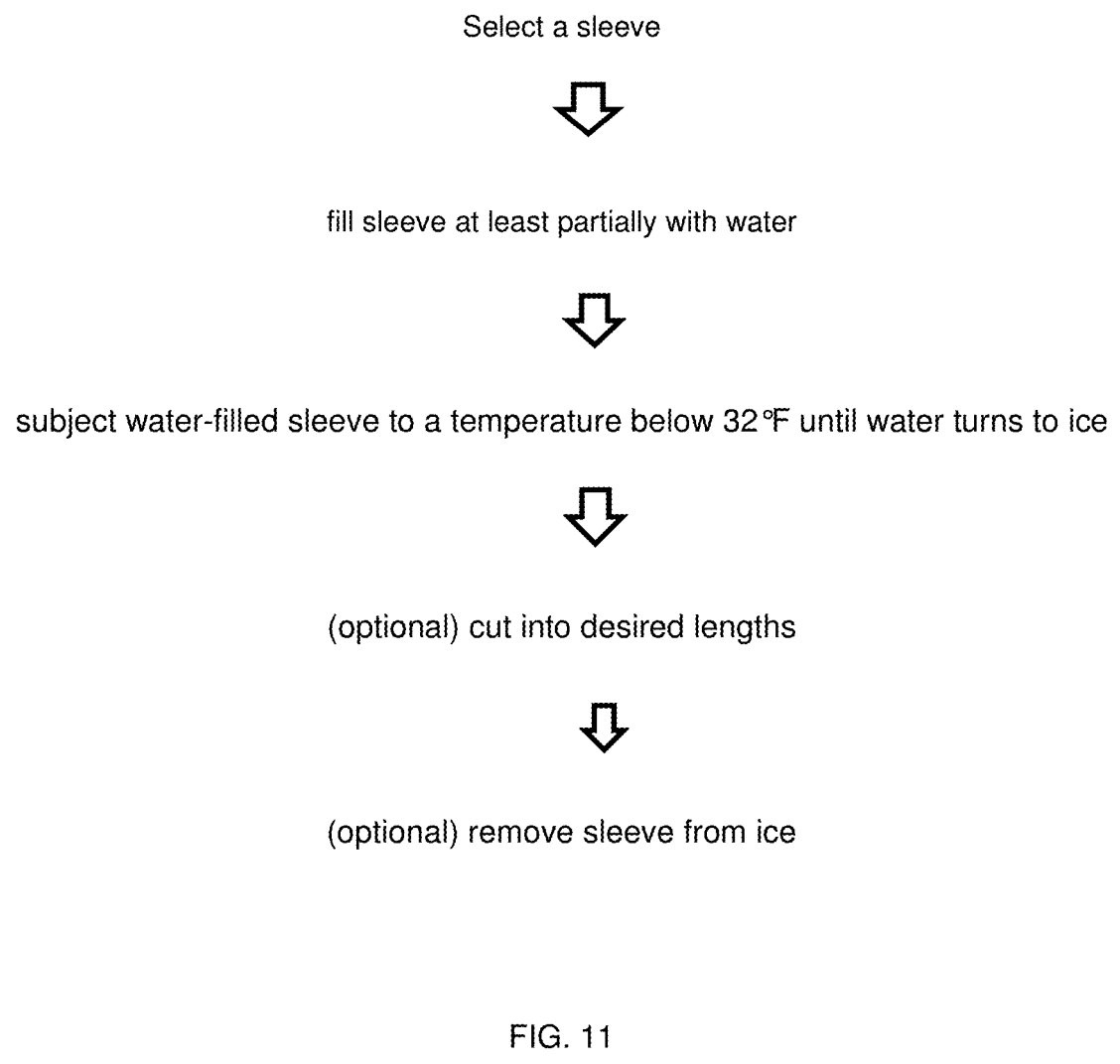

FIG. 11 shows a flowchart for forming ice logs in accordance with principles of the present disclosure. The first step is to select a sleeve. The sleeve may then be filled with water. The water filled sleeve is then subjected to a temperature below freezing (i.e., below 32° F. or 0° C.). Once the water has frozen, the sleeve is removed from the frozen water which forms an ice log for building an ice structure. While the sleeve could be warmed to help slide the sleeve off the ice log, this is a time-consuming process and releases a wet ice log which must be handled carefully so that the builder's hands do not freeze to the log. In contrast, the flexible sleeves in accordance with the present disclosure prevent the logs from freezing together and can be quickly removed without needing to apply head to unfreeze the outer surface of the ice log.

FIG. 12 shows a flowchart for building an ice structure in accordance with principles of the present disclosure. The first step is to select a plurality of ice logs. The ice logs are placed in close proximity and snow, slush, or water is applied to the ice logs at a temperature below 0° C. or 32° F. so as to connect the ice logs by ice. In building the ice structure, a plurality of the ice logs will be disposed generally vertically, and a plurality of ice logs will be disposed generally horizontally and attached to the generally vertically ice logs with snow, slush, or water and allow them to freeze. The method may include disposing a plurality of ice logs so as to form the floor of a second story of the ice structure, or as a second story balcony.

The method may further include spraying the ice logs so as to develop icicles on the ice logs. The method may further include adding additional ice logs to the initial ice logs and/or icicles in order to increase the size of the structure.

As has been partially discussed above, the of use flexible sleeves to form ice logs has numerous advantages. The ice logs may be clearer and stronger than conventional icicles as the water freezes into a log having a substantially consistent diameter and are not reliant on dripping water to form. The ice logs can be grown much larger in a shorter amount of time, and the creator has much greater control over the end product. For example, one company making ice structures from icicles claims that it places more than 1000 icicles a day to build its structures. Those icicles would typically be a variety of shapes and sizes. In contrast, in the present disclosure the person forming the ice logs can accurately produce a given length of ice logs of diameter a, and another given length of diameter b, and still yet another length of diameter b as required.

Rather than using thousands of icicles which are 2-3 feet long and tapering from one end to another, the present system allows large structures to be built using large ice logs. For example, a center log for a large attraction could be desired at 9 inches in diameter and 15 feet tall. Creating such an icicle would be extremely difficult as the weight of the icicle may cause it to break off of the structure from which it depends long before the icicle reached such a length or girth. In contrast, such an ice log can be formed by simply selecting a 9-inch sleeve which is about 16 feet long, tying off one end of the sleeve, filling it with water and tying off the opposing end. The ice log can be made in a commercial freezer or left outside to freeze in ambient air. When needed, the sleeve may be simply cut off and the ice log used. (The sleeve could also be left on if desired). Prior to removal, the sleeve reduces the risk of ice logs freezing together, thereby facilitating transport and stacking at the location of the attraction.

Hundreds of ice logs of smaller diameters can be formed overnight if temperatures are sufficiently cold, or over a couple of days at warmer temperatures. For example, ten sleeves 100 feet long and four inches in diameter can be used to make 50 20-foot ice logs or 100 10-foot ice logs which are all substantially 4 inches in diameter. Thus, it is much easier to plan out an ice sculpture because the person making the ice logs knows exactly what he or she will get.

Less water is wasted as the sleeve keeps all of the water necessary to form the ice log within the sleeve, rather than dripping onto the ground as only some of the water freezes to make an icicle. Likewise, the creator of the ice structure can mold the ice logs into desired shapes and can be easily removed from the sleeves when needed, but stored in the sleeves prior to use to prevent the ice logs sticking together. The sleeves also help prevent braking if two ice logs get banged together.

Figure 13:
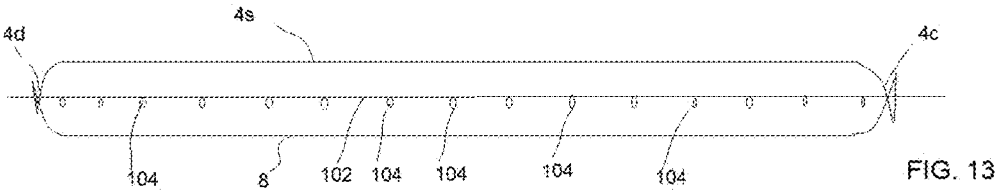
FIG. 13 show a side view of an ice log being formed with lighting or power cables disposed therein.

Turning now to FIG. 13, there is shown an ice log 4*s* formed in accordance with another aspect of the invention. Instead of simply placing lighting or other powered lines behind various ice formations, the ice log 4*s* is formed by placing a powered line 102, such as a line having lights 104, in the sleeve 8. One end 4*d* I tied off and the sleeve filled with water. The other end 4*c* is then tied off. The water in the sleeve 8 is then frozen and the sleeve removed. The resulting ice log 4*c* has a power line inside (which could be used to power various attractions and/or to light the ice log. It will be appreciated that lighting behind a structure tends to pass the same color of light through the adjacent structures. By having the lighting inside the log, however, individual logs could be provided with different color lights, or could change color in sequence.

Figure 14:
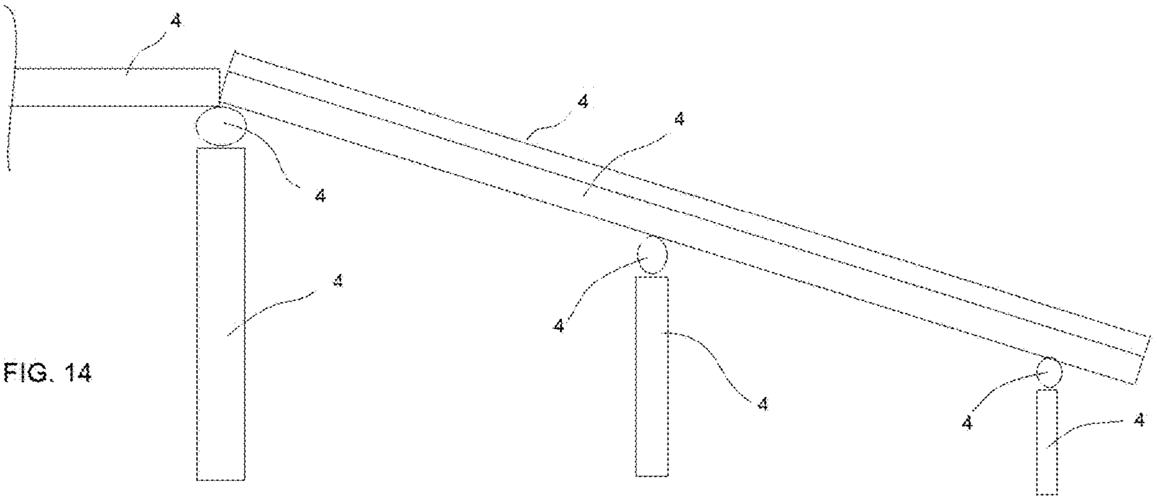
FIG. 14 shows an alternate configuration of an ice slide made in accordance with the present disclosure.

Turning now to FIG. 14, there is shown a slide 110 made from a plurality of ice logs 4. Because long ice logs can be formed quickly, within a day or two, a slide could be formed by building a structure and then placing long ice logs for form the slide surface. Larger ice logs could be used on the sides to prevent the user from falling off the slide. The slide could be added to a balcony, or could simply have a staircase.

Figure 15:
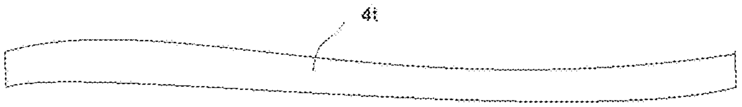
FIG. 15 shows an alternate ice log that could be used to make an ice slide.

FIG. 15 shows an alternate configuration of an ice log 4*t* which could be used for a slide so that the slide has a waive like surface. This can be done by simply laying of the water filled sleeves so that the sleeves curve. As soon as the water in the sleeve freezes, the ice logs can be used to make a wave shaped slide.

Figure 16:
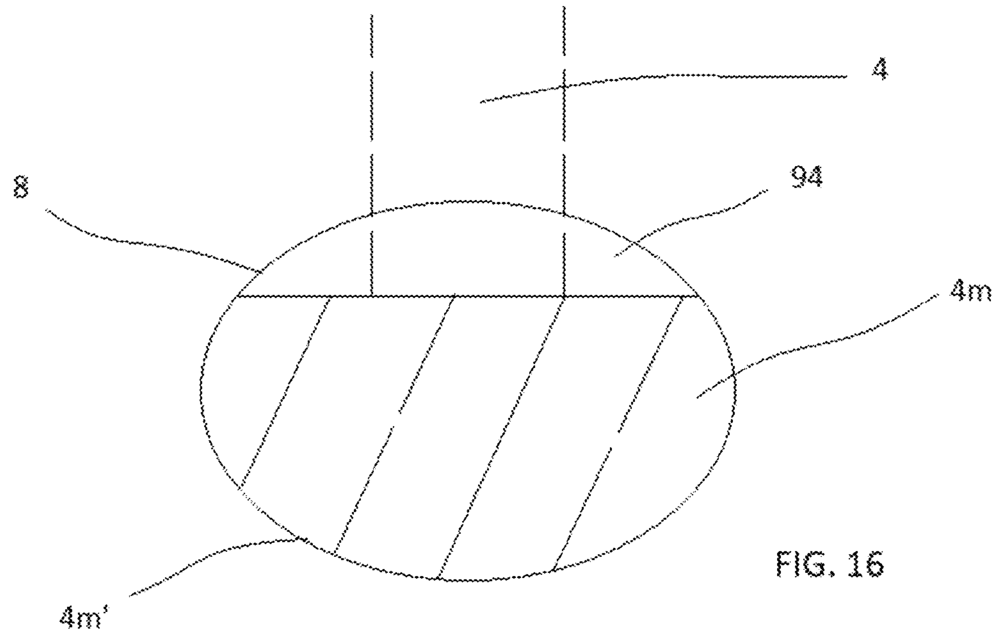
FIG. 16 shows a cross-sectional view of an ice log which is being used as a base.

FIG. 16 shows an alternate construction method. While cutting holes in the ice log 4*m* which forms the base or footing is desirable, it is not necessary. By filling the sleeve 8 only part way with water, the top surface of the ice log 4*m* will be generally flat and an air gap 84 may be left between the top surface of the ice log and the sleeve. When all or a portion of the sleeve 8 is cut way, the flat surface of the ice log 4*m* is available for attaching other ice logs thereto. The flat surface of the ice log 4*m* facilitates a vertical ice log 4 from being disposed on the base/footer formed by ice log 4*m* by simply placing the end of the ice log 4 on the base. If the bottom end of the ice log 4 and the upper surface of the ice log 4*m* are sufficiently flat and of sufficient diameter, the ice log 4 may remain in place without any bracing, support, etc. Water or snow can then be added to freeze the two ice logs together.

It will be appreciated that ice log 4*m* in FIG. 16 has a rounded lower surface 4*m*', unlike the lower surface of the ice log 4*m* shown in FIG. 9. This can be accomplished by forming the ice log on snow, which will give way to the weight of the water, while the ice log 4*m* in FIG. 9 is characteristic of a partially filled sleeve made on solid ground.

Figure 17:
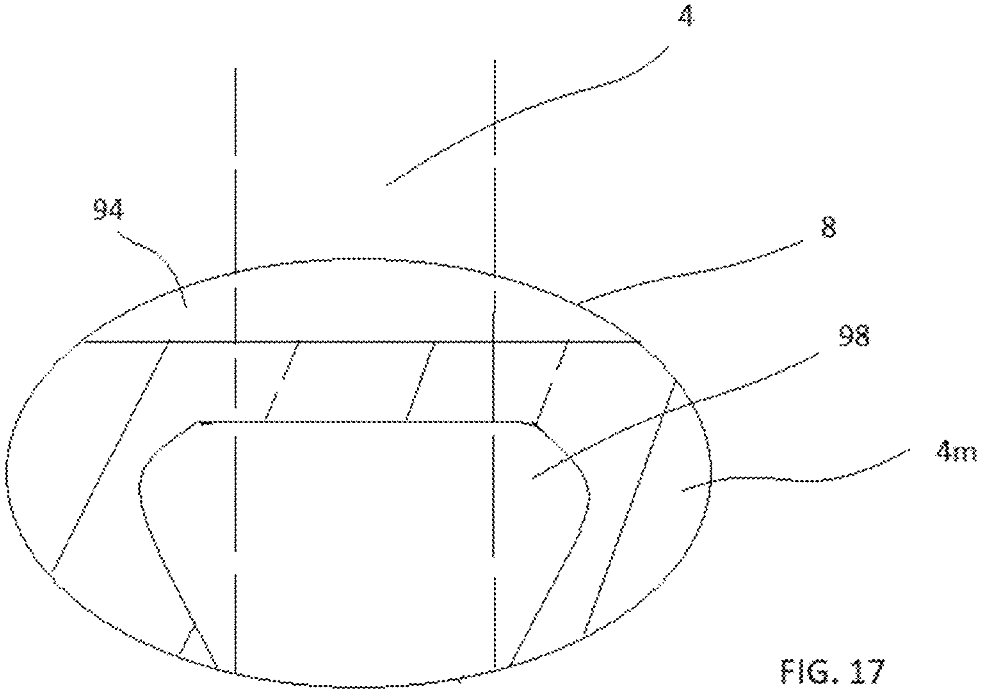
FIG. 17 shows a cross-sectional view of an alternate embodiment of an ice log which is being used as a base.

Turning now to FIG. 17, there is shown an alternate method for attaching ice logs 4 to the ice log 4*m* forming the base/footing. The ice log 4*m* may be allowed to freeze part way so as to leave a pocket of water 98. The sleeve 8 may be partially or completely removed, and a hole cut in the upper surface of the ice log 4*m* sufficient to insert another ice log 4 into the pocket of water 98. If the ice log has not been left long enough that the bottom is frozen, the pocket of water 98 can be drained off by removing the sleeve or puncturing the sleeve if desired. If the lower portion of the sleeve is left in place and not punctured or the bottom of the ice log has frozen solid, the water is then allowed to continue to freeze, thereby anchoring the ice logs in the base/footing. The pocket left by any water which does escape may also be filled in by over-spay. If necessary, vertical ice log 4 may be held while the water continues to freeze. This can be done by external support and/or snow or slush can be packed around the juncture of the two ice logs and allowed to freeze solid.

It will be appreciated that the technique for inserting the logs can be used for a variety of purposes. For example, a ladder of ice could be made by cutting into partially frozen logs and inserting a number of rungs, and then inserting the opposing ends of the rungs into another frozen or partially frozen ice log.

It will be appreciated that inserting an ice log into a pocket in another ice log allows for a substantially stronger juncture than simply applying slush or snow amount the end allowing that to freeze. The pocket can provide substantial lateral support, which and prevent an ice log from braking off of an ice log to which it is attached. This also allows for building at an accelerated rate. For example, depending on ambient temperature, buildings two or more stories tall can be built in a single day. Likewise, this mechanism for inserting facilitates stronger joints and less waste of water as less ice needs to be added simply to hold the pieces of ice in place.

Figure 18:
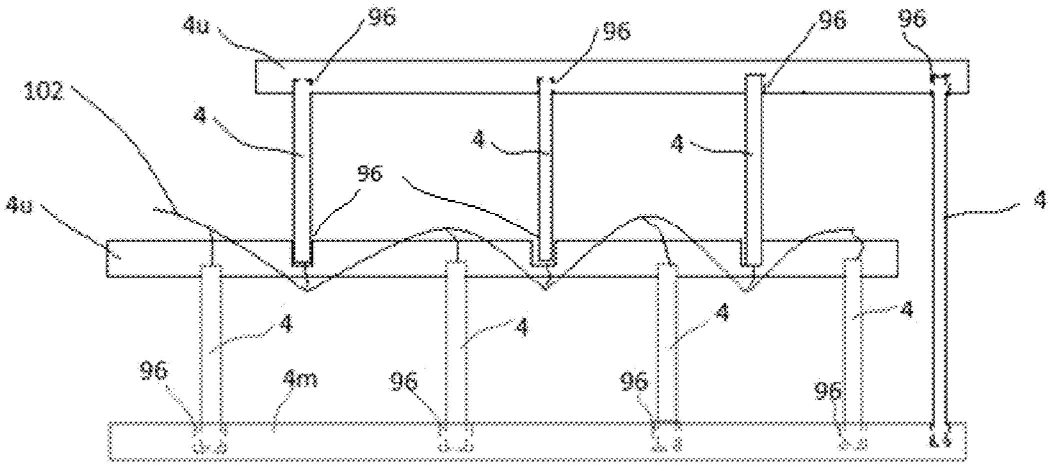
FIG. 18 shows a side view of an ice structure built in accordance with one aspect of the present disclosure.

Turning now to FIG. 18, there is shown an alternate application of aspects of the present disclosure. As mentioned previously, the use of ice logs allows for rapid building. Not only can the pockets 96 be formed in the ice log 4*m* forming the base or footing, but pockets 96 can also be formed in ice logs 4*u* which form a header. The pockets 96 allow the top end of the vertical (or other orientation) ice logs to be inserted into the ice log 4*u*. (The outlines of the pockets 96 have not been shown in the middle horizontal ice log 4*u* which acts as a base for the top row of vertical ice logs and as a header for the bottom row or vertical ice logs for the sake of clarity but may be present to gain the advantages discussed herein) Inserting the end in a sufficient distance (i.e., 3-4 inches) provides virtually instant stability to the ice log 4*u* on top of the ice logs 4. Preferably the pockets are only slightly larger than the diameter of the vertical ice logs 4 so that the ice logs almost nest in place. Slush or water can be placed in the pockets just before attachment to promote the vertical ice logs and the header ice log 4*u* from freezing together. Additionally, if structure is over-sprayed with water, the freezing water also freezes the various ice logs together. However, the simple engagement of the top of the ice log in the pocket instantly prevents the vertical ice log from simply rolling off and avoid the need for someone to stand there and hold it in place while slush freezes sufficiently to hold the ice logs together.

Because the header ice logs 4*u* are already generally stable when placed on the vertical ice logs 4, the next layer of vertical ice logs can be added much sooner. There is no need to coat the ice logs over night with water to build up sufficient mass to hold the weight of the next level as is done when building with icicles. Additionally, the use of the pockets 96 facilitates the use of powered lines 102. Once the pocket 96 is formed, a drill can be used to form a small hole through to the exterior of the ice log or the powered line can be passed out of a small gap in the pocket 96 between the generally horizontally extending ice logs 4*m*, 4*u* and the vertical ice logs 4. The lower lines 102 can be connected together and then power supplied to, for example, light up multiple ice logs from inside the ice logs. This provides a more brilliant effect than simply backlighting, and ice logs can be made to provide individual colors or combinations of colors. For example, one ice log could light up blue, while the next is green, the next is yellow and the next is purple. Patterns could be formed in the structure by regulating when a given color is being shown in each ice log.

Figure 19:
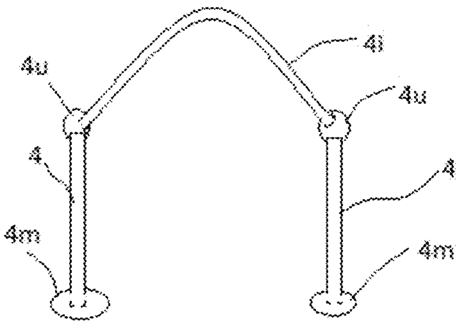
FIG. 19 shows an end view of an ice structure built in accordance with one aspect of the present disclosure.

While shown in FIG. 18 as relating to vertical ice logs, it will be appreciated that the use of pockets could be done with a variety of different ice log shapes and orientations. For example, instead of vertical ice logs on the second layer, pockets may be used to hold ice logs used for lateral bracing between adjacent vertical or horizontal ice logs. Likewise, a row of semicircular ice logs **4*i* could be used to form a tunnel by attaching to adjacent header ice logs 4*u* as shown in FIG. 19. Furthermore, the structures shown in FIG. 5** could be attached using pockets to facilitate attachment beyond simple surface attachment with a coating of ice.

Figure 20:
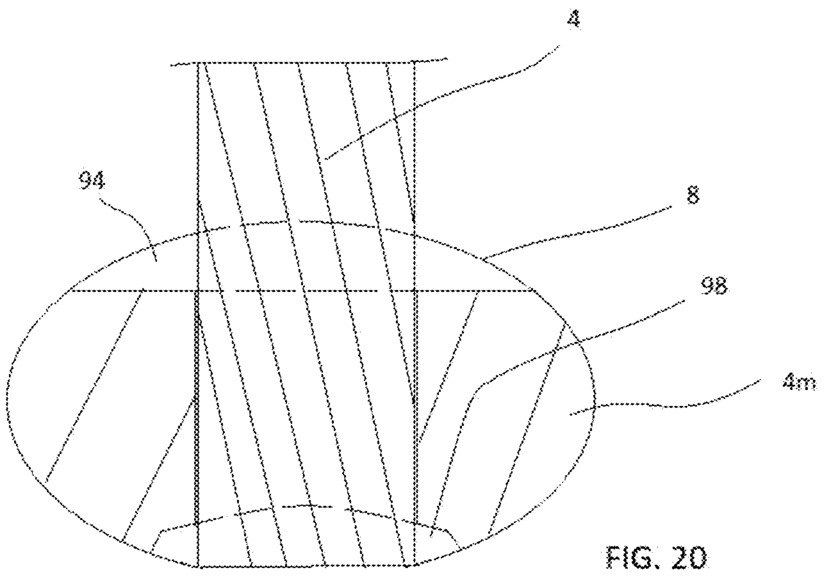
FIG. 20 shows a side cross-sectional view of an ice log mounted in another ice log that is acting as a footer.

FIG. 20 shows a side cross-sectional view of an ice log 4 mounted in another ice log that is acting as a base/footing. The ice log **4*m* may be allowed to freeze almost all of the way or may be completely frozen. An auger or similar tool can then be used to cut a hole in the ice log 4*m*. Preferably, the hole formed by the auger, etc., is only slightly bigger than the ice log 4 which will be inserted into the hole vertically. If the ice log 4*m* has not completely frozen, the bottom of ice log 4 will displace the water and may force it upwardly between the ice log 4 and the sidewalls of the hole formed in ice log 4*m*. Sidewalls of the hole hold the ice log 4 in place so that the water can freeze—thereby bonding the two ice logs together. Because the thickness of the ice log 4*m* acting as the base/footing, the vertical ice log 4** does not need to be held in place while the water freezes, and slush is not required to bond the two structures together.

While an air pocket 94 may be left at the top of the ice log **4*m* forming the base/footing and under the sleeve 8, such is not necessary as the hole in the ice log 4*m* holds the vertical ice log in place. The ice logs can then be over-sprayed with water to strengthen the attachment. A worker, however, does not need to pack slush around the ice log 4** and need not hold it is place while the slush freezes.

Figure 21:
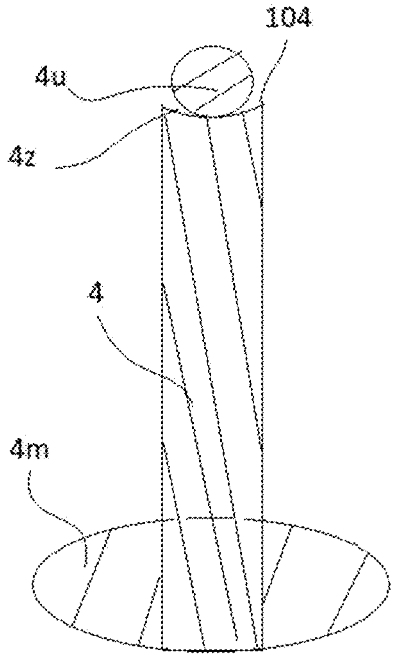
FIG. 21 shows a side cross-sectional view of the combined vertical ice log and footer with another ice log disposed on top of the vertical ice log.

FIG. 21 shows a side cross-sectional view of the combined vertical ice log and footer similar to FIG. 20 in which the two have frozen together. One end **4*z* of the ice log 4 has been provided with a concave surface 104. This may be accomplished by using a router, a sander, or even a heat source applied to the end of the ice log. The concave surface 104 provides a cradle or channel into which another ice log may rest in a more stable orientation than trying to place an ice log with a convex outer surface on a flat top. A v-shaped surface could also be provided by simply making two cuts with a chain saw while cutting a larger ice log. The area which is not filled by the ice log 104** allows water to pool and then freeze the two ice logs together.

Figure 22:
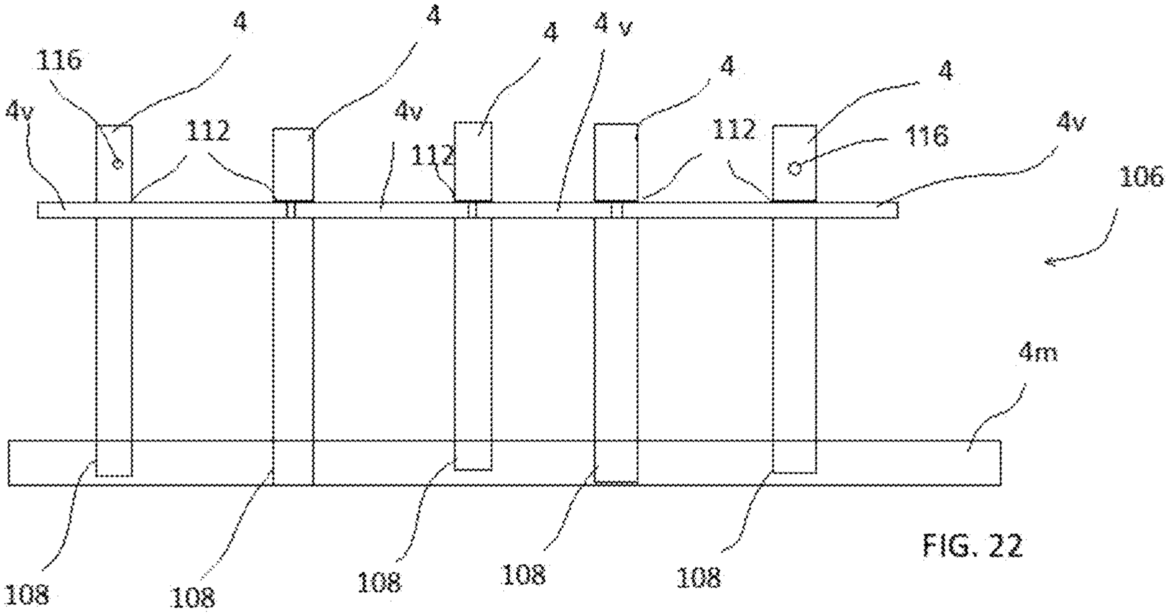
FIG. 22 shows a side view of an ice from formed out of ice longs which have been inserted into holes formed in other ice logs.
Figure 23:
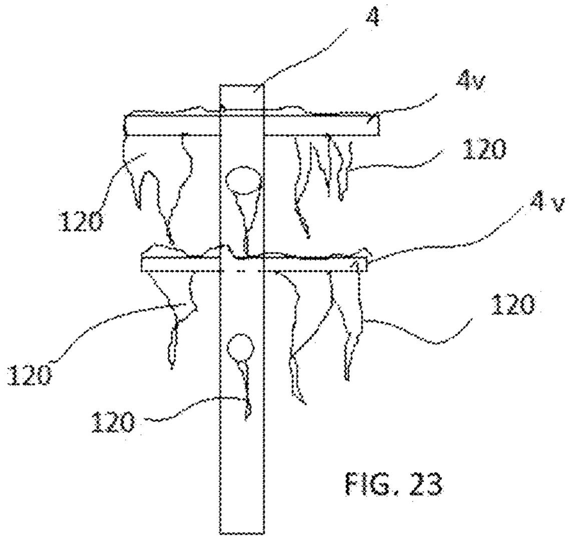
FIG. 23 shows a side view of an ice log having intersecting ice logs extending therethrough with icicles formed thereon.

FIG. 22 shows a side view of an ice frame, generally indicated at 106, formed out of ice logs which have been inserted into holes formed in other ice logs. Ice log **4*m* has a plurality of holes 108 formed therein. The holes 108 may extend completely through ice log 4*m* or may extend only part way. The sidewalls of the holes 108 help hold the vertical ice logs 4 in place and if cut properly no slush is needed. Additional support to the ice logs 4 is provided by one or more intersecting logs 4*v* which may extend into or through holes 112 in one or more of the vertical logs 4. Thus, a single intersecting ice log 4 can be placed between two ice logs, or a single intersecting ice log can extend through a number of ice logs 4. The intersecting ice logs 4*v* provide support for the ice logs 4 and provide a structure for icicles to form when the ice frame 106 is over-sprayed with water. The intersecting ice logs 4*v* may even extend beyond the ice logs 4 to allow for additional decorative icicles to form therefrom, or to be used to attach other items. It will be appreciated that the ice logs 4 may include additional holes 116 to allow intersecting ice logs 4*v* to extend in multiple directions. This allows the frame 106 to be held together solidly in three-dimensions without the use of slush and facilitates a strong bond between the ice logs as the frame 106 is over-sprayed with water. It also allows an easy location for decorative icicles 120 to grow as shown in FIG. 23** without the use of slush.

Figure 24:
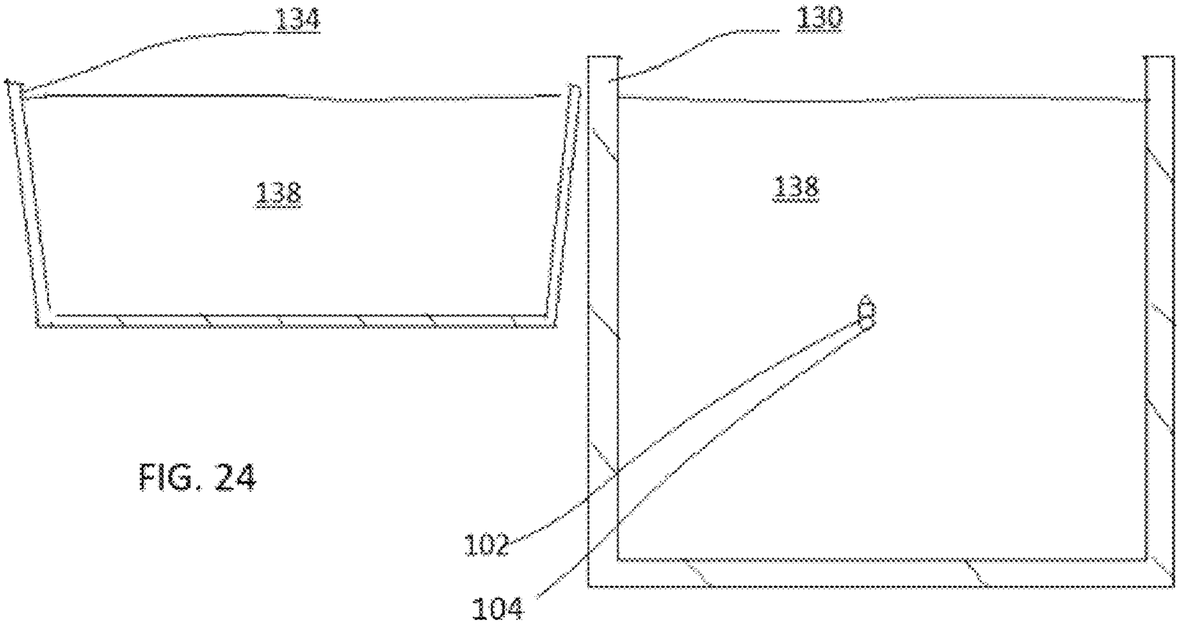
FIG. 24 shows a cross-sectional view of two molds used from forming ice beams.

FIG. 24 shows a cross-sectional view of an alternate method for forming ice in accordance with the present disclosure. Rather than using a flexible sleeve, an elongate semi-flexible or generally rigid mold 130, 134 can be used. The molds may have a generally rectangular cross-section, though the bottom end thereof may be slightly narrower than the top both to allow the molds to be stacked and to facilitate the removal of ice therefrom. It will be appreciated that if the mold material—such as plastic or metal is only semi-rigid the molds 130, 134 can be flexed slightly to help remove the water 138 after it has frozen into and ice beam.

The molds 130, 134 are filled with water 138, which is then allowed to freeze. The molds form pieces of ice similar in shape to a wood beam and the ice is thus referred to as an ice beam—meaning that one or more sides are generally flat, as compared to an ice log which is generally rounded.

The molds 130, 134 may be made from metal or durable plastic or polycarbonate materials and reused each year. Thus, a large number of molds of desired sizes may be used, e.g., 4 feet, 8 feet, 10 feet and 12 feet, etc. Alternatively, the molds 130, 134 could be made from relatively inexpensive materials such as extruded plastic or polycarbonates in very long pieces and then cut with the ice beam to a desired size by a chain saw etc., as discussed above. The cut pieces of the molds 130, 134 can be stacked upon each other with the molds helping to prevent the ice beams from freezing to other ice beams.

Also shown in FIG. 24 is a light string 102 and light similar to that shown in FIG. 13. The lights may be held in place while the water turns to ice so that a resulting ice beam can be lit from the inside.

Figure 25:
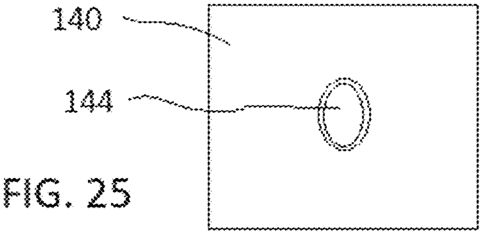
FIG. 25 shows a front view of a cap for a mold having a projection for forming a hole.
Figure 26:
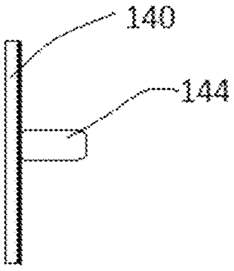
FIG. 26 shows a side view of the cap of FIG. 25.

It will be appreciated that the molds may be integrally formed with an end to hold the water in. Alternatively, a removeable end cap may be used. FIG. 25 shows a front view of a removable end cap 140 for one of the molds which has a propection 144. The projection 144 is used to form a hole in the end of a beam formed by freezing the water 138. The hole in the beam is designed to receive an ice dowel or spike. Other projections may be included along the mold to form additional holes in the ice beam or holes can be formed by drilling etc. Because the ice beams are generally flat on each side, they can be stacked one upon the other more securely without the need for slush. Additionally, ice dowels—which may be 0.5-2 inches in diameter, can be inserted into the holes in various ice beams to hold the beams more securely in place while they are over-sprayed by water.

The end caps 140 may be adhesively attached to the remainder of the mold, attached mechanically, such as by friction or a clip, or may be formed integrally with the mold and then cut off to allow the ice beam to come out.

Figure 27:
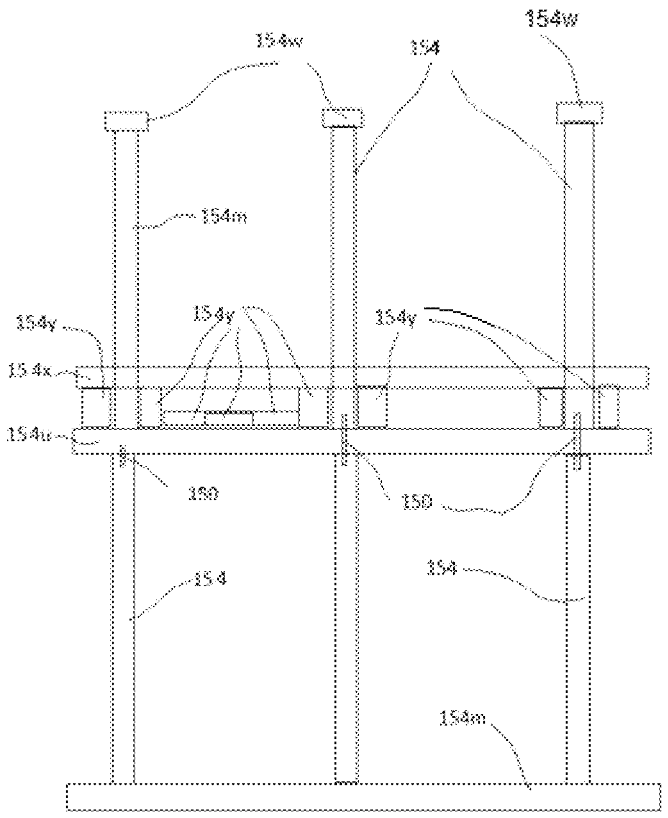
FIG. 27 shows a side view of an ice frame built using ice beams to form a framework which can be connected together without using slush.
Figure 28:
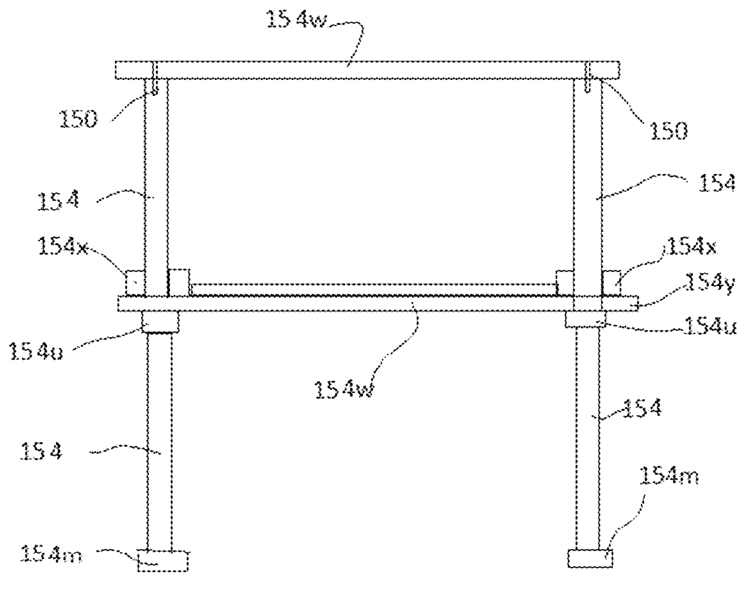
FIG. 28 shows a front view of the ice frame shown in FIG. 27.

The ice dowels provide additional shear strength between adjoining ice logs as shown in FIG. 27. The ice beams 154 can be stood upon the footers **154*m*. An ice dowel 150 may be used to help hold the ice beams 54 and 154*m* in the proper orientation with one another. The ice dowels 150 can also be used to secure the ice beams 154 with the ice beam header 155*u*. A plurality of purlins 154*y* can extend between the headers 154*u*. Some purlins 154*y* can be larger than others to provide additional support for the vertical ice beams 154**. When over-sprayed with water, the ice beams form a very strong bond which hold the frame of the ice structure together without the need for slush.

Turning now to FIG. 29, there is shown an end view of end cap 140 which has a projection 144 which is generally in the shape of a cross. FIG. 30 provides a side view of the end cap 140 and projection 144. FIG. 30 also shows a handle 158 which may be used for attaching or removing the end cap 140 to the mold (not shown).

FIGS. 31 and 32 show alternate end caps 140 having projections 144 which will shape the end of the ice beam formed in the mold with which the end cap is associated. The projections 144 may be sufficiently long that they form a channel extending into the end of the ice beam. This allows a channel or slot to be left in the top of the ice beam formed in the mold. As will be discussed, the slots facilitate adding together ice beams in a secure and efficient manner.

FIG. 33 shows an end view of an ice beam 154 formed using the end cap in FIG. 29. The ice beam 154 is left with a pair of intersecting channels 170. In other words, there are a number of projections 172 sticking out the end. Both the channels 170 and projections may be fairly flat on the sides. As shown in FIGS. 34 and 34A, this allows a number of ice beams 164 to be placed in the slots and extend from the ice beam 154. The ice beams 164 may be butted against one another and may nest in the slots 170 so even a small amount of water poured on joints between the beams 154 and 164 will enable all of them to be frozen together. No slush is required, and the five beams quickly form a continuous mass of ice. It will also be appreciated that a single ice beam 164 could run through one of the channels 170 in one direction with the other two ice beams 164 are secured thereto and to the ice beam 154. The channels or slots 170 may be of a depth so that the tops of the beams 164 rest generally even with the tops of the projections 172 as shown in FIG. 34A. Alternatively, the beams 164 may extend above the projections to facilitate the attachment of additional ice beams in a vertical orientation. For example, another ice beam (not shown) having a similar end could be turned upside down and its slots aligned the ice beams so that the projections 172 of the two similar ice beams touch or nearly touch and then water added so as to form a longer ice beam 154 with ice beams 164 coming out the middle. A small sprayer or simply a couple of water could be used to add water either just before attachment or just after to facilitate the ice beams freezing together.

Figure 35:
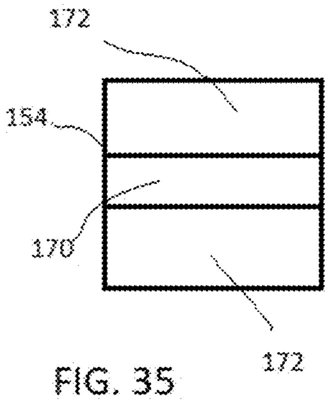
FIGS. 35 shows an end view of a beam made using the cap shown in FIG. 31.
Figure 36:
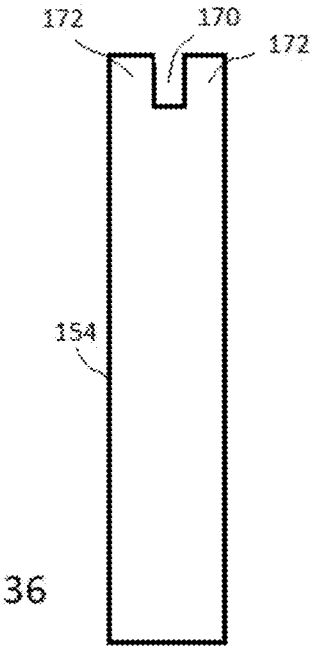
FIG. 36 shows a side view of the beam of FIG. 35.

FIGS. 35 and 36 shown an end view and a side view, respectively, of the end of an ice beam 154 made using the cap 140 shown in FIG. 31. The slot 170 left in the end of the ice beam 154 may receive a single ice beam or a pair of ice beams with their ends disposed in the slot. A small amount of water will freeze the ice beams together. Because of the thermal mass of the ice beams 154, etc., the water will freeze very quickly. As with the embodiment shown in FIG. 34, the other beams could extend beyond the projections 172 of ice beam 154 so that another ice beam 154 could be added on top. It will be appreciated that the slots could be, for example, from 1 to 4 inches wide. The advantage of a wider slot is that the ice beam disposed therein is larger and can thus support the weight of a person while building. For example, an ice beam which is 4 inches wide and 6 inches tall can easily support even a large man. This enables the structure to be built much more quickly than ice icicles and in many cases even ice logs.

Figure 37:
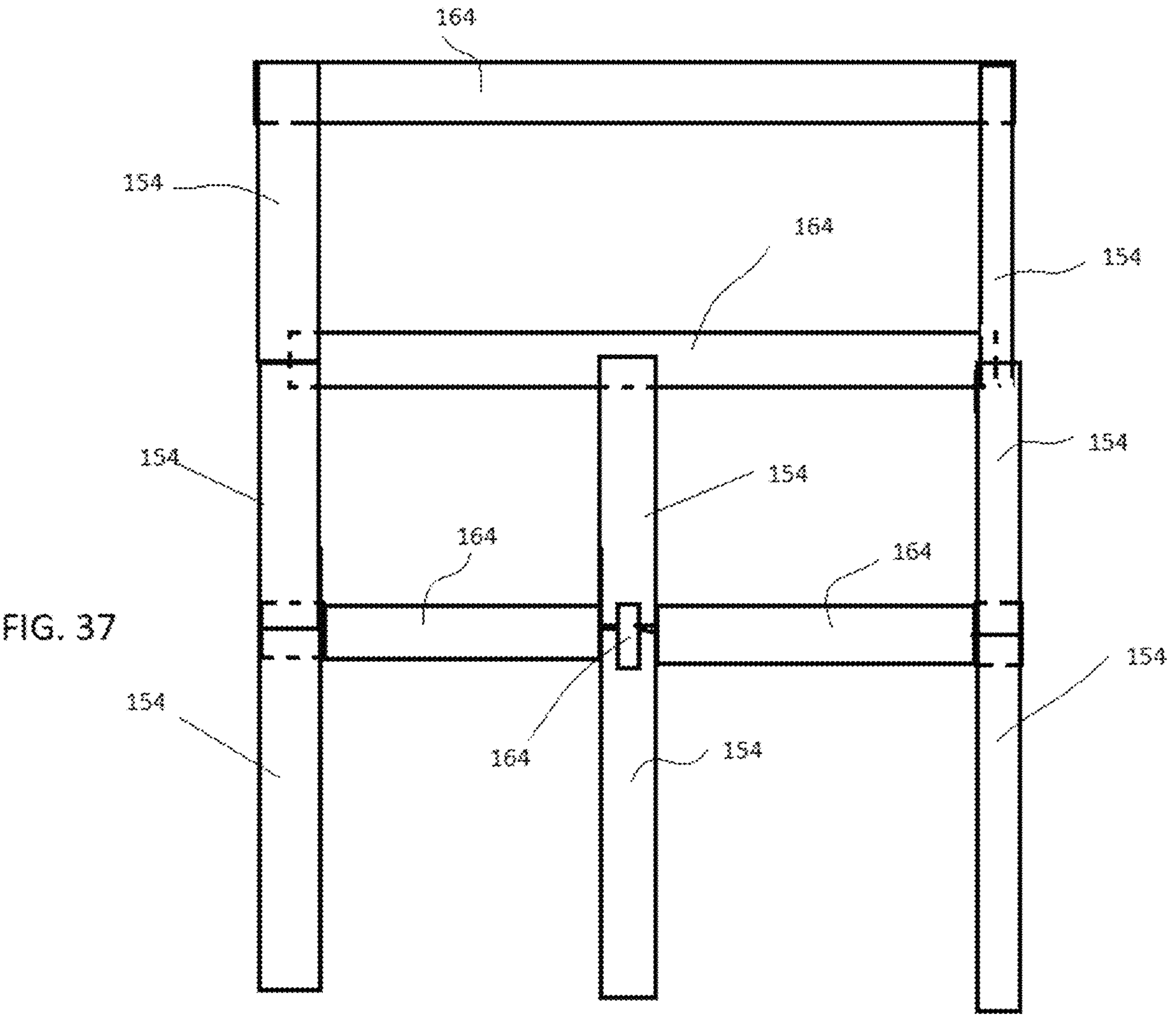
FIG. 37 shows a side view of a plurality of beams fitted together to form a support structure.

FIG. 37 shows a structure built from the ice beams 154 and 164. Because the ice beams can be fit and frozen together very quickly, the structure can be built in considerably less time than when made with icicles or even ice logs. The ice beams provide support for one another and their relatively large size allow any water poured thereon to freeze very quickly because of the thermal mass. Additionally, the size of the ice beams can support hundreds or even thousands of pounds of weight, with each ice beam being supported by another ice beam including in 3 dimensions.

Figure 38:
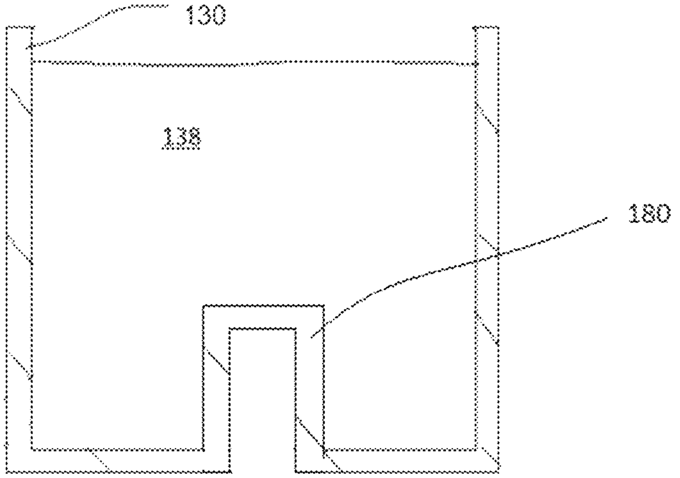
FIG. 38 shows a cross-sectional view of a mold having a projection formed therein for making a slot along the length of the ice beam.

In addition to an ice beam 154 being made to have slots in the ends, one or more slots may be formed along the length of the ice beam so as to facilitate the attachment of other ice beams or ice logs. FIG. 38 shows a cross-sectional view of a mold 130 having a projection 180 formed therein for making a slot along the length of the ice beam when the water 138 freezes. The projection may 180 extend along the entire length of the mold 130 or may be only for a small portion. Likewise, multiple projections could be used to form an ice beam having a plurality of notches formed therein found mounting other ice beams.

Figure 39:
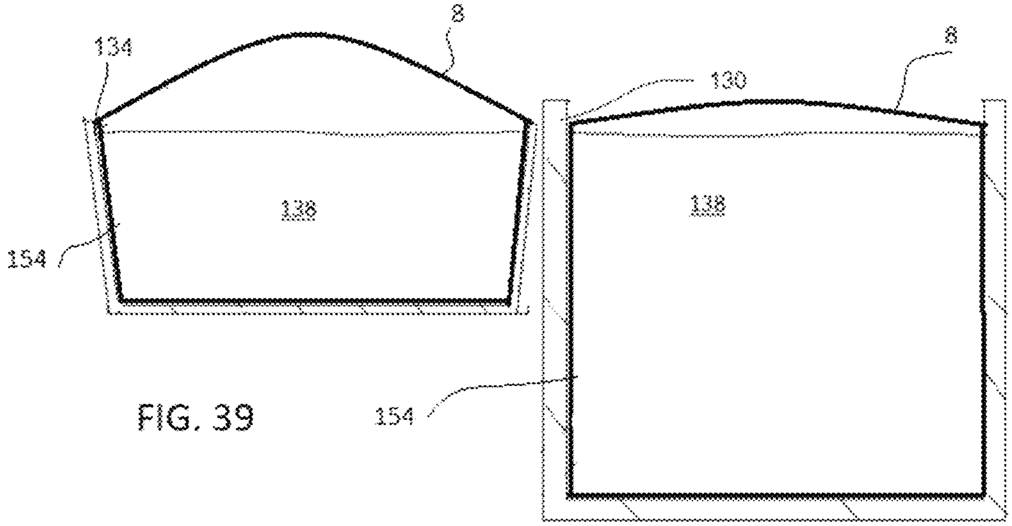
FIG. 39 shows cross-sectional view of a mold having a sleeve disposed therein for making ice beams.

FIG. 39 shows an alternate method for creating the ice beams which is somewhat a hybrid between the methods previously discussed for making ice logs and that for making ice beams. It has been found to be advantageous to dispose sleeves 8 in the molds 130 used to make the ice beams. The sleeves 8 easily conform to the shape of the mold and help to make the ice beam 154 easier to remove from the mold after the water 138 has frozen. They also allow the molds 130 to be used without being watertight. Thus, for example, 10 molds of 15 feet in length can be put end to end and then a 150-foot sleeve can be placed in the molds and filled with water. The desired ice beam in formed, while allowing ease of handling and better portability for the molds. Curved molds could also be used to provide precise shapes if desired and beams could even be formed at a right angle.

It also allows stacking of the ice beams with less risk of the ice beams being frozen together. Thus, the sleeve allows substantially all of the benefits of ice logs with all of the geometric benefits of flat side(s) which the molds provide to the ice beams. Additionally, end caps are not needed for these ice beams. The sleeve 8 is simply disposed in the mold(s) 130 and with one end tied off (before or after placement in the mold). The sleeve 8 is then filled with a hose, etc., to the desired height and the opposing end tied off. This may be within the mold(s) or sticking out as shown in FIG. 40. Once frozen, the ice beam is pulled out of the mold and cut into the desired sizes. Where end caps are used, it will be appreciated in light of the present disclosure that the sleeves 8 will facilitate removal of the end caps from the ice beam.

FIG. 41 shows a side view of a wall formed by stacked ice beams 154, which may include pieces extending in multiple directions'. Unlike icicles or ice logs, the ice beams can simply be stacked upon one another to form walls or other structures because of their flat sides. This can also facilitate making buildings out of ice.

One challenge when spraying water over ice from sprinklers is that the taller one extends the tubing 180 with the sprinkler 182, the more likely the tubing is to bend to one side or the other. This is shown on the right side of FIG. 42. The sprinkler tubing 180 leans to one side and makes the spray pattern less reliable. Additionally, the water is more likely to drip from the sprinkler than be sprayed properly over the structure. The droplets of water take longer to freeze than the very small drops normally sprayed by the sprinkler. The drops may be large enough that they melt the ice as they drop. Thus, it is not uncommon to look directly down from the sprinkler and to see a void going all the way to the ground in which there is no ice. Additionally, the tubing 180 can lean against the ice and melt its way through the ice.

Figure 43:
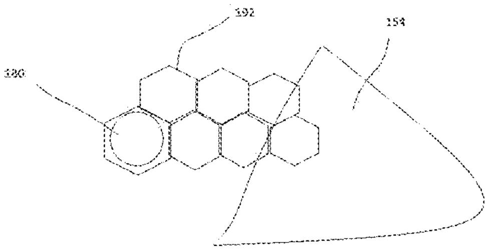
FIG. 43 shows a top view of FIG. 42.
Figure 44:
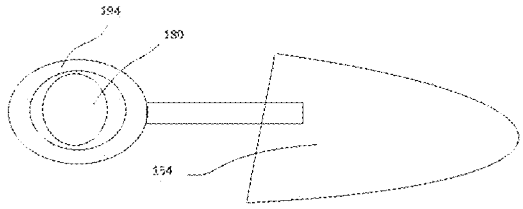
FIG. 44 shows a top view of an alternate implementation of FIG. 42.

In accordance with one aspect of the present disclosure it has been found that it is best to thermally isolate the tubing 180 from the ice 154. As shown in FIGS. 43 and 44, this may be accomplished by placing an insulator 190, such as chicken wire 192 (FIG. 43), an I-bolt 194 (FIG. 44) a screen or some other structure about the tubing 180 which allows water to pass but holds the tubing in position. An opposing end of the insulator 190 may be attached to the ice 154 of the ice structure. This can be done by slush or by simply running a sprinkler over the top. The insulator will hold the tubing vertical, thereby reducing dripping. It will also separate the tubing from the ice, so that if there is water running along the tubing 180, the water will not melt the ice. Instead, it is given additional space to either freeze or travel to the ground.

Figure 45:
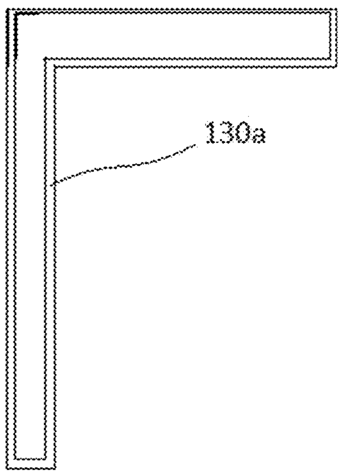
FIG. 45 shows an alternate configuration of a mold forming an ice beam.

Turning now to FIG. 45, there is shown an alternate configuration of a mold 130*a*. The mold has an outer wall is formed so that a void within the mold has portions which are disposed at a right angle to one another. The mold 130*a* may be filled with water directly and frozen, or a sleeve can be placed in the mold. The resulting ice beam is formed at a right angle. Such an ice beam can be used for a variety of situations. The ice beam can simply be placed so that the upper end rests against an existing ice structure to instantly form the framework of a tunnel. Alternatively, when stacking beams to form a house, etc., the right-angle beam can be used in corners to provide additional strength without having to wait for a substantial amount of water to freeze. Thus, for example, a first layer of ice beams could be placed end perpendicular to one another to form a corner. They could have water sprayed on them and then the ice beam made from the mold of FIG. 45 placed on top of the other two. The corner is thus instantly strengthened over what would be provided by abutting logs and allowing water to freeze over them.

Figure 46:
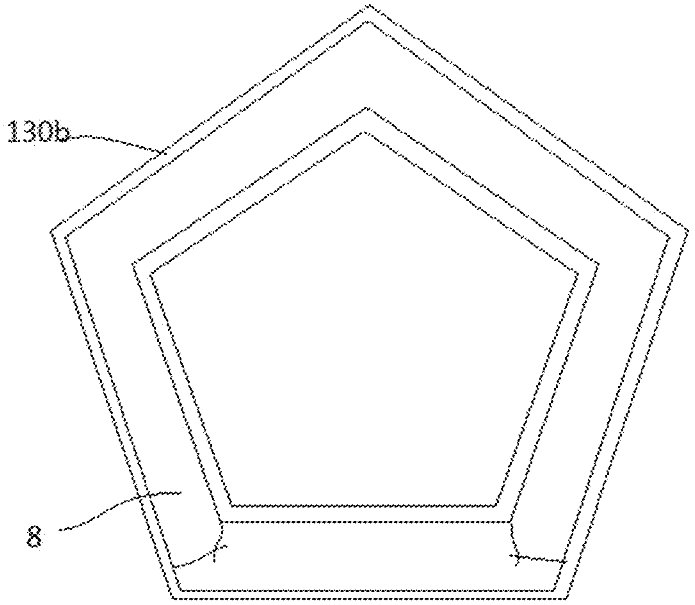
FIG. 46 shows an alternate configuration of a mold for forming an ice structure.
Figure 47:
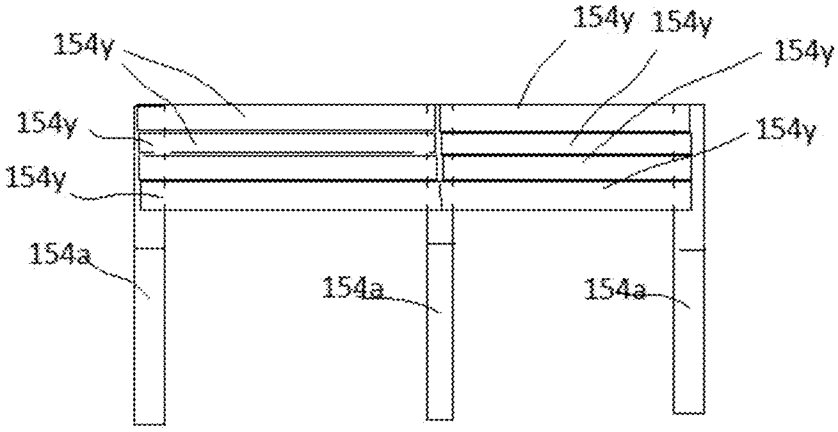
FIG. 47 shows the start of a tunnel formed by the ice beam formed from the mold in FIG. 46 and a plurality of purlins.

Turning now to FIG. 46, there is shown a mold 130*b* in the shape of a pentagon so that the void formed by the sidewalls of the mold has five portions which are angularly offset from one another. A sleeve 8 is disposed inside and filled with water. The sleeve 80 may be placed to cover the entire pentagon shape or only a portion. It then freezes into a shaped ice beam. FIG. 47 shows a tunnel being constructed from three ice beams 154*a* which are connected together by purlins 154*y*. Because of the thermal mass and slope of the ice beams 154, the purlins 154*y* may stay in place by simply spraying the ice beam with water and then placing the purlins on top. The structure can then be sprayed with water to have icicles develop and finish off the tunnel. This allows the tunnel to be formed more quickly that prior art methods which requires laboriously attaching icicles together and gradually developing a tunnel shape.

Figure 48:
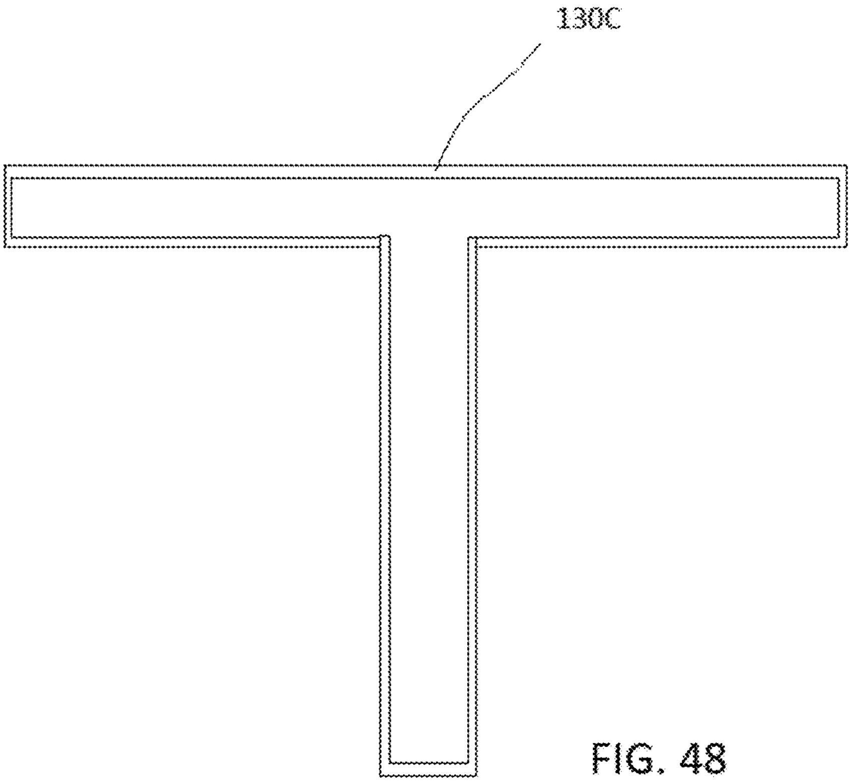
FIG. 48 shows an alternate configuration of a mold for forming an ice structure.

Turning now to FIG. 48, there is shown an alternate configuration of a mold 130C. The mold has a sidewall disposed so that the void defined by the sidewall is T shaped. Thus, a beam formed therein is generally T shaped. It will be appreciated that if it desired to dispose the water in a sleeve, a specialty sleeve having a T shape would be needed. Such may be used, or a piece of plastic can simply be used to line the inside of the mold 130*c* to facilitate the release of the beam of ice once the water has frozen. The mold could also be sprayed with oil or some other hydrophobic material to promote release of the ice beam once it is frozen.

Figure 49:
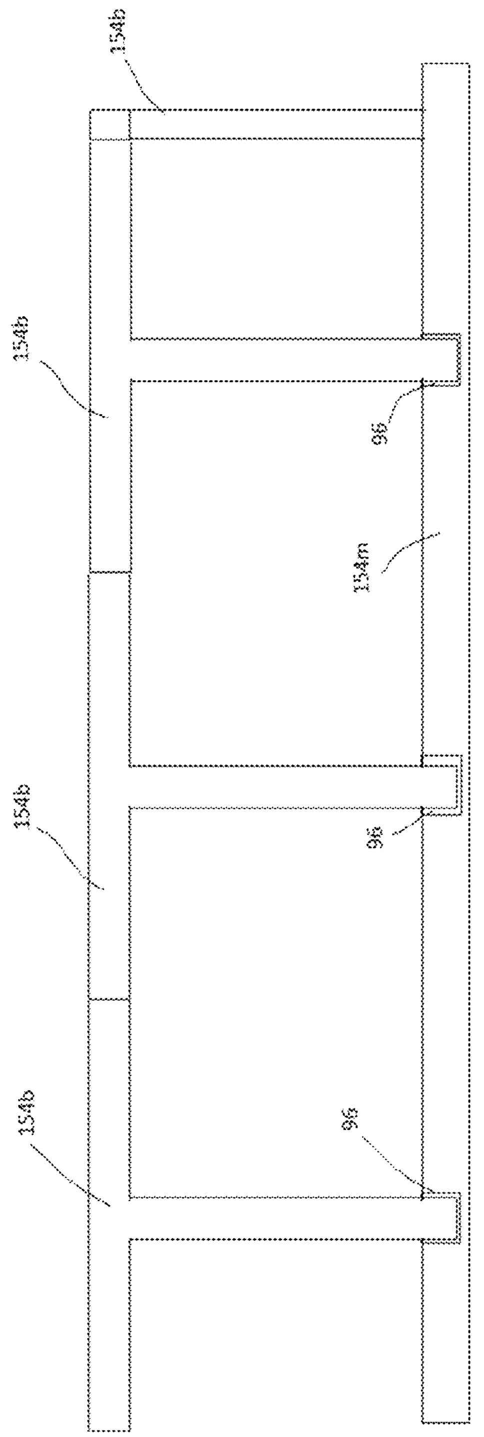
FIG. 49 shows a wall formed by ice beams made in the mold of FIG. 48.

FIG. 49 shows a plurality of ice beams 154*b* formed from the mold 130*c* mounted in a footer 154*m*. The ice beams 154*b* can be placed end to end and then over sprayed with water. The last beam 154*b* on the right is disposed at a 90-degree angle to the others, so as to form a corner. By connecting the ice beams 154*b* to the footer 154*m*, a wall can be constructed very quickly and may stand, for example, 8-10 feet high.

Additionally, it is easy to place two rows of such ice beams and then add purlins connecting them thereby forming a tunnel. Thus, the entire substructure of the tunnel can be formed before the first overspray with water. Because time is so critical when building ice structures, the use of ice beams and ice logs are highly advantageous. The ice logs or ice beams are minimally affected by wind or extremely cold temperatures. Additionally, they allow building of the ice structure much more quickly. For example, if the holes 96 are only slightly bigger than the ice beams 154*b*, the ice beams can be placed in the footer 154*m* and purlins can be added on top of the ice beams prior to the application of any overspray to the structure. This allows workers to continue to build without being sprayed with water or having to handle slush, either of which can increase the risk of hypothermia. This allows the ice structure to advance at a rapid pace, thereby facilitating display to the public shortly after the ice structure was begun. In areas with short cold seasons, this could mean the difference between an ice structure being profitable and losing money.

Figure 50:
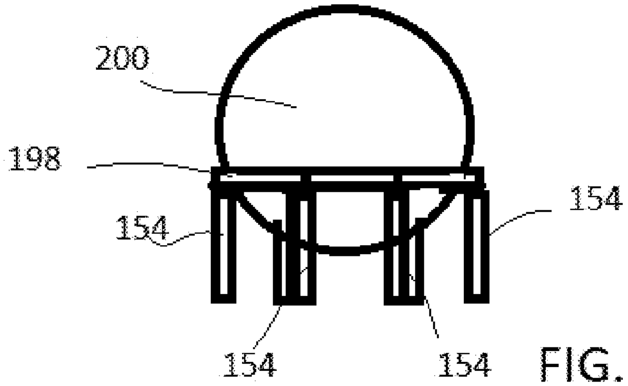
FIG. 50 shows a side view of a partially build sound chamber.
Figure 51:
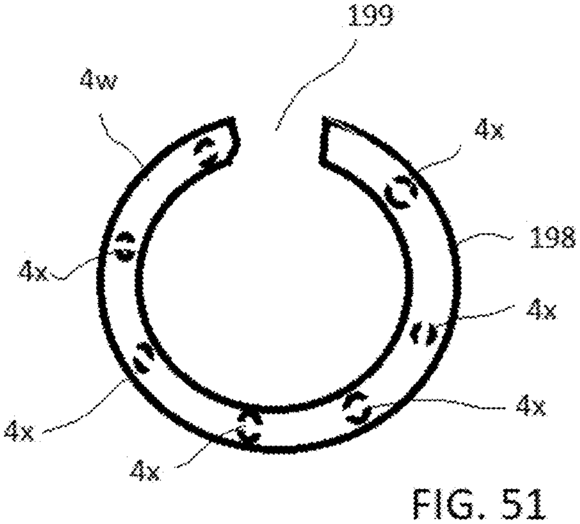
FIG. 51 shows a top view of the base for a sound chamber.

Turning now to FIG. 50, there is shown a method for forming a sound chamber out of ice. Certain room structures are known for carrying sound particularly well. This can be accomplished in an ice structure by forming a base of ice logs of ice beams. As shown in FIG. 50 a number of ice beams 154 are disposed to form an elevated base 198 which is polygonal or generally circular. FIG. 51 shows a top view of the formation of a base 198 from a generally circular ice log 4*w* supported by a number of vertical ice logs 4*x*. A gap 199 is left to facilitate the formation of a door.

Figure 52:
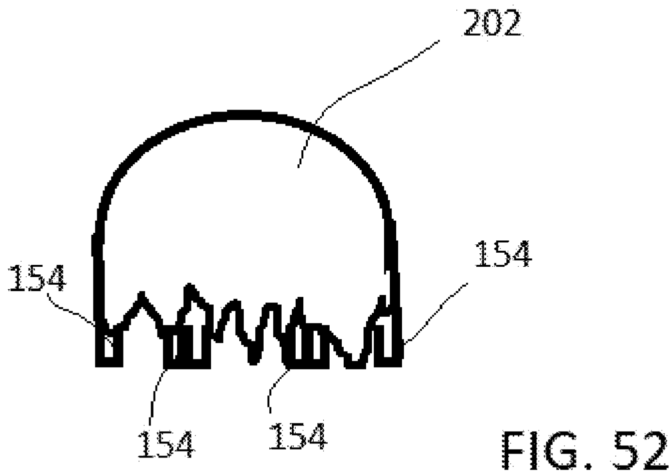
FIG. 52 shows an external view of a sound chamber being formed.
Figure 53:
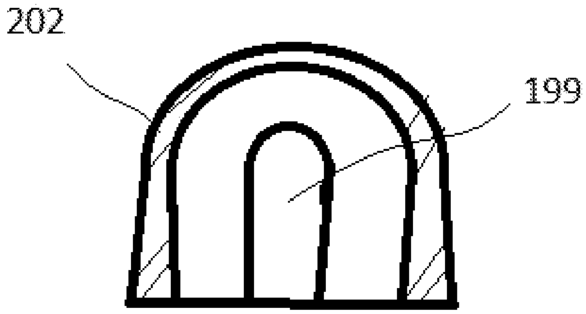
FIG. 53 shows a cross-sectional view of the sound chamber.

A mold, such as a very large beach ball 200 or a domed shaped tent is disposed in the opening and then over sprayed with water. The ice 202 formed by the water freezing on top of the mold progresses down and covers the ice logs or ice beams 154 as shown in FIG. 52. The mold 200 is then collapsed leaving a room which has an almost perfectly spherical ceiling as shown in FIG. 53. When a person whispers facing one wall, a person standing adjacent the opposing wall can hear what is being said.

Thus, there is disclosed a method for creating an ice structure. It will be appreciated that numerous modifications may be made without departing from the scope and spirit of this disclosure. The appended claims are intended to cover such modifications.

What is claimed is:

1. A method of building an ice structure, the method comprising:

forming a first piece of ice in the form of a first ice beam, the first ice beam having at least one flat portion along a side length thereof;

selecting a second piece of ice in the form of an ice log or a second ice beam and disposing the ice log or the second ice beam generally vertically so that a top of the second piece of ice has an end portion, at least part of which is generally horizontal; and disposing the at least one flat portion of the first ice beam on the end portion which is generally horizontal on top of the second piece of ice, and applying water to freeze the first ice beam to the second piece of ice without using slush.

2. The method according to claim 1, wherein forming the first ice beam comprises disposing plurality of molds adjacent one another, disposing a sleeve in the plurality of molds, and at least partially filling the sleeve with water.

3. A method of building an ice structure, the method comprising:

forming a first piece of ice in the form of a first ice beam, the first ice beam having at least one flat portion along a side length thereof;

selecting a second piece of ice in the form of an ice log or a second ice beam and disposing the ice log or the second ice beam generally vertically so that a top of the second piece of ice has an end portion, at least part of which is generally horizontal; and disposing the at least one flat portion of the first ice beam on the end portion which is generally horizontal on top of the second piece of ice, and applying water to freeze the first ice beam to the second piece of ice, and wherein the second piece of ice has a channel formed therein and wherein the first ice beam is disposed at least partially within the channel.

4. The method according to claim 3, wherein the method comprises inserting the first ice beam into the channel in the second piece of ice so that an upper surface of the first ice beam is substantially co-planar with an end of the second piece of ice.

5. The method according to claim 3, wherein the method comprises inserting the first ice beam into the channel in the second piece of ice so that the first ice beam extends above the second piece of ice adjacent an end thereof.

6. The method according to claim 5, wherein the method comprises attaching a third piece of ice in the form of an ice beam to the first ice beam and the second piece of ice so that one end each of the first ice beam, the second piece of ice and the third piece of ice are frozen together.

7. The method according to claim 6, wherein at least four ice logs and ice beams are attached together at adjacent ends.

8. The method according to claim 7, wherein at least three ice beams are disposed in channels at one end of the second piece of ice.

9. The method according to claim 3, wherein the second piece of ice has a length and an end and wherein the channel is formed in the end of the second piece of ice generally perpendicular to the length of the second piece of ice.

10. A method of building an ice structure, the method comprising:

forming a first piece of ice in the form of a first ice beam, the first ice beam having at least one flat portion along a side length thereof;

selecting a second piece of ice in the form of an ice log or a second ice beam and disposing the ice log or the second ice beam generally vertically so that a top of the second piece of ice has an end portion, at least part of which is generally horizontal; and disposing the at least one flat portion of the first ice beam on the end portion which is generally horizontal on top of the second piece of ice, and applying water to freeze the first ice beam to the second piece of ice, and wherein forming the first piece of ice in the form of a first ice beam comprises:

selecting an elongate mold having at least one flat side;

disposing a sleeve in the elongate mold;

filling the sleeve at least partially with water; and freezing the water.

11. The method according to claim 10, wherein the sleeve extends beyond the elongate mold.

12. The method according to claim 11, where in the elongate mold has at least two generally flat sides.

13. The method according to claim 12, wherein the elongate mold includes an end cap, and wherein the end cap has a projection extending into the elongate mold such that freezing water in the elongate mold to form an ice log leaves a void or a channel in an end of the ice log.

14. The method according to claim 10, wherein the elongate mold defines a void and wherein the void has at least two portions which are disposed at an angle to one another.

15. The method according to claim 14, wherein the void includes a right angle.

16. The method according to claim 10, wherein selecting an elongate mold having at least one flat side comprises selecting a plurality of elongate molds and disposing them side by side, and wherein disposing a sleeve in the elongate mold comprises disposing the sleeve in the plurality of elongate molds prior to at least partially filling the sleeve with water.

17. A method of building an ice structure, the method comprising:

forming a first piece of ice in the form of a first ice beam, the first ice beam having at least one flat portion along a side length thereof;

selecting a second piece of ice in the form of an ice log or a second ice beam and disposing the ice log or the second ice beam generally vertically so that a top of the second piece of ice has an end portion, at least part of which is generally horizontal; and disposing the at least one flat portion of the first ice beam on the end portion which is generally horizontal on top of the second piece of ice, and applying water to freeze the first ice beam to the second piece of ice, and wherein applying water to freeze the first ice beam to the second piece of ice comprises spraying water from a sprinkler attached to a piece of tubing, the piece of tubing feeding water to the sprinkler and wherein the method further comprises disposing an insulator about the tubing feeding water to the sprinkler; and attaching another portion of the insulator to the ice structure.

18. The method according to claim 17, wherein the method comprises using chicken wire as the insulator.

19. The method according to claim 17, wherein the method comprises using an I-bolt.

20. A method for forming an ice structure comprising:

forming a first plurality of ice beams by freezing water in a mold having at least one flat side formed thereon;

forming a plurality of supports formed by a plurality of ice logs and/or a second plurality of ice beams;

disposing the plurality of supports generally vertically, the plurality of supports having a generally flat on a top portions thereon;

disposing the first plurality of ice beams on top of the plurality of supports with a flat side of the first plurality of ice beams being disposed on the generally flat top portion of the generally vertical supports; and applying water to the first plurality of ice beams and the plurality of supports to thereby freeze the first plurality of ice beams to the plurality of supports without the use of slush.

21. The method according to claim 20, wherein forming the first plurality of ice beams comprises disposing plurality of molds adjacent one another, disposing a sleeve in the plurality of molds, and at least partially filling the sleeve with water.

* * * * *